US012198641B2

(12) United States Patent
Lee et al.

(10) Patent No.: US 12,198,641 B2
(45) Date of Patent: Jan. 14, 2025

(54) HEAD-MOUNTED ELECTRONIC DEVICE AND METHOD FOR OPERATING THE SAME

(71) Applicant: Samsung Electronics Co., Ltd., Suwon-si (KR)

(72) Inventors: Seungjoo Lee, Suwon-si (KR); Dongil Son, Suwon-si (KR); Seungnyun Kim, Suwon-si (KR); Jongmin Yoon, Suwon-si (KR); Gisoo Lim, Suwon-si (KR); Kyusik Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/517,898

(22) Filed: Nov. 22, 2023

(65) Prior Publication Data

US 2024/0169935 A1    May 23, 2024

Related U.S. Application Data

(63) Continuation of application No. PCT/KR2023/018584, filed on Nov. 17, 2023.

(30) Foreign Application Priority Data

Nov. 23, 2022  (KR) .................. 10-2022-0158724
Dec. 5, 2022   (KR) .................. 10-2022-0167697

(51) Int. Cl.
*G09G 3/34*      (2006.01)
*G01K 1/02*      (2021.01)

(52) U.S. Cl.
CPC ............. *G09G 3/3406* (2013.01); *G01K 1/02* (2013.01); *G09G 2320/041* (2013.01); *G09G 2320/0626* (2013.01)

(58) Field of Classification Search
CPC ........... G09G 3/3406; G09G 2320/041; G09G 2320/0626; G01K 1/02; G01K 1/14; G01K 3/06; G01K 7/22
See application file for complete search history.

(56) References Cited

U.S. PATENT DOCUMENTS 11,735,147 B1 *   8/2023  Chou ................... G09G 5/391
                                                345/76
2002/0033815 A1 *  3/2002  Kasahara ............. G09G 3/2944
                                                345/204

(Continued)

FOREIGN PATENT DOCUMENTS

JP    2012-168221 A    9/2012
JP    2016-045244 A    4/2016

(Continued)

OTHER PUBLICATIONS

International Search Report and written opinion dated Feb. 16, 2024, issued in International Application No. PCT/KR2023/018584.

*Primary Examiner* — William Lu
(74) *Attorney, Agent, or Firm* — Jefferson IP Law, LLP

(57) ABSTRACT

An electronic device is provided. The electronic device includes an optical lens, a display module configured to display a screen through the optical lens, a sensor module configured to measure a temperature of the display module at one or more positions, and memory, and at least one processor. The instructions that, when executed by the at least one processor, cause the electronic device to control the display module to display a designated screen, obtain at least one temperature respectively corresponding to the one or more positions from the sensor module while displaying the designated screen, and based on the obtained at least one temperature, change a luminance of at least a part of the (Continued)

designated screen or change a display area of the display module based on the obtained at least one temperature.

19 Claims, 15 Drawing Sheets

(56) References Cited

U.S. PATENT DOCUMENTS

| | | | | |
|---|---|---|---|---|
| 2005/0242747 A1* | 11/2005 | Kato | ........... | G09G 3/3225 |
| | | | | 315/169.3 |
| 2011/0128304 A1* | 6/2011 | Takaoka | ........... | H05B 45/46 |
| | | | | 315/185 R |
| 2012/0017013 A1* | 1/2012 | Sandhu | ........... | G16Z 99/00 |
| | | | | 710/61 |
| 2015/0257232 A1* | 9/2015 | Kimura | ........... | G02F 1/133603 |
| | | | | 349/61 |
| 2017/0169759 A1* | 6/2017 | Jang | ........... | G09G 3/3406 |
| 2017/0270841 A1* | 9/2017 | An | ........... | G09G 5/005 |
| 2018/0052501 A1 | 2/2018 | Jones, Jr. et al. | | |
| 2018/0122872 A1* | 5/2018 | Kim | ........... | G09G 3/3233 |
| 2018/0190187 A1* | 7/2018 | Hack | ........... | G09G 3/3208 |
| 2019/0355304 A1* | 11/2019 | Tanaka | ........... | G01K 7/22 |
| 2020/0041349 A1* | 2/2020 | Capps | ........... | G01J 5/60 |
| 2020/0098335 A1* | 3/2020 | Chen | ........... | G09G 5/10 |
| 2020/0394958 A1* | 12/2020 | Takahara | ........... | H01L 27/124 |
| 2020/0413028 A1 | 12/2020 | Tsau | | |
| 2021/0304685 A1* | 9/2021 | Nicholson | ........... | G09G 3/3413 |
| 2021/0327103 A1* | 10/2021 | Kim | ........... | G06T 7/13 |
| 2022/0147124 A1* | 5/2022 | Choi | ........... | G02B 27/0172 |
| 2022/0293022 A1* | 9/2022 | Masuda | ........... | G09G 3/3233 |
| 2023/0105229 A1* | 4/2023 | Yoo | ........... | G06F 3/013 |
| | | | | 345/690 |
| 2023/0154368 A1* | 5/2023 | Ahn | ........... | G09G 3/002 |
| | | | | 345/589 |
| 2024/0111185 A1* | 4/2024 | Wang | ........... | G09G 3/3406 |
| 2024/0127743 A1* | 4/2024 | Moon | ........... | G09G 3/2096 |

FOREIGN PATENT DOCUMENTS

| | | |
|---|---|---|
| JP | 2020/177163 A | 10/2020 |
| JP | 2021/104781 A | 7/2021 |
| KR | 10-2014-0066258 A | 5/2014 |
| KR | 10-2015-0110299 A | 10/2015 |
| KR | 10-2022-0024906 A | 3/2022 |
| KR | 10-2022-0030806 A | 3/2022 |
| WO | 2021/157064 A1 | 8/2021 |

\* cited by examiner (a)

(b)

HEAD-MOUNTED ELECTRONIC DEVICE AND METHOD FOR OPERATING THE SAME

CROSS-REFERENCE TO RELATED APPLICATION(S)

This application is a continuation application, claiming priority under § 365(c), of an International application No. PCT/KR2023/018584, filed on Nov. 17, 2023, which is based on and claims the benefit of a Korean patent application number 10-2022-0158724, filed on Nov. 23, 2022, in the Korean Intellectual Property Office, and of a Korean patent application number 10-2022-0167697, filed on Dec. 5, 2022, in the Korean Intellectual Property Office, the disclosure of each of which is incorporated by reference herein in its entirety.

TECHNICAL FIELD

The disclosure relates to technology for a head-mounted electronic device worn on a user's head and a method for operating the same.

BACKGROUND ART

With the development of electronic device technology, various types of electronic devices, such as mobile communication terminals, personal digital assistants (PDAs), electronic schedulers, smartphones, tablet personal computers (PCs), and wearable devices, are widely used.

For example, the electronic device may provide virtual reality (VR), which allows the user to have a real-like experience in a virtual world created by computer. Electronic devices may also provide augmented reality (AR), which adds virtual information (or objects) to the real world, and mixed reality (MR), which is a combination of the virtual reality and the augmented reality.

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problems

Aspects of the disclosure are to address at least the above-mentioned problems and/or disadvantages and to provide at least the advantages described below. Accordingly, an aspect of the disclosure is to provide an electronic device comprising an optical lens, a display module configured to display a screen through the optical lens, a sensor module configured to measure a temperature of the display module at one or more positions, memory storing instructions, and at least one processor. The instructions, when executed by the at least one processor, cause the electronic device to control to the display module to display a designated screen. The instructions cause the electronic device to obtain at least one temperature respectively corresponding to the one or more positions from the sensor module while displaying the designated screen. The instructions cause the electronic device to change a luminance of at least a part of the designated screen or change a display area of the display module based on the obtained at least one temperature.

Additional aspects will be set forth in part in the description which follows and, in part, will be apparent from the description, or may be learned by practice of the presented embodiments.

In accordance with an aspect of the disclosure, a method for operating an electronic device is provided. The method includes controlling a display module configured to display a screen through an optical lens to display a designated screen. The method for operating the electronic device according to an embodiment includes obtaining at least one temperature respectively corresponding to one or more positions from a sensor module configured to measure a temperature of the display module at the one or more positions while displaying the designated screen. The method for operating the electronic device according to an embodiment may comprise changing a luminance of at least a part of the designated screen or changing a display area of the display module based on the obtained at least one temperature.

In accordance with another aspect of the disclosure, a computer-readable medium storing instructions, which when executed by at least one processor of an electronic device, cause the electronic device to execute operations, is provided. The operations comprise controlling a display module configured to display a screen through an optical lens to display a designated screen based on execution of an application. The operations comprise obtaining at least one temperature respectively corresponding to one or more positions from a sensor module configured to measure a temperature of the display module at the one or more positions while displaying the designated screen. The operations changing a luminance of at least a part of the designated screen or changing a display area of the display module based on the obtained at least one temperature.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
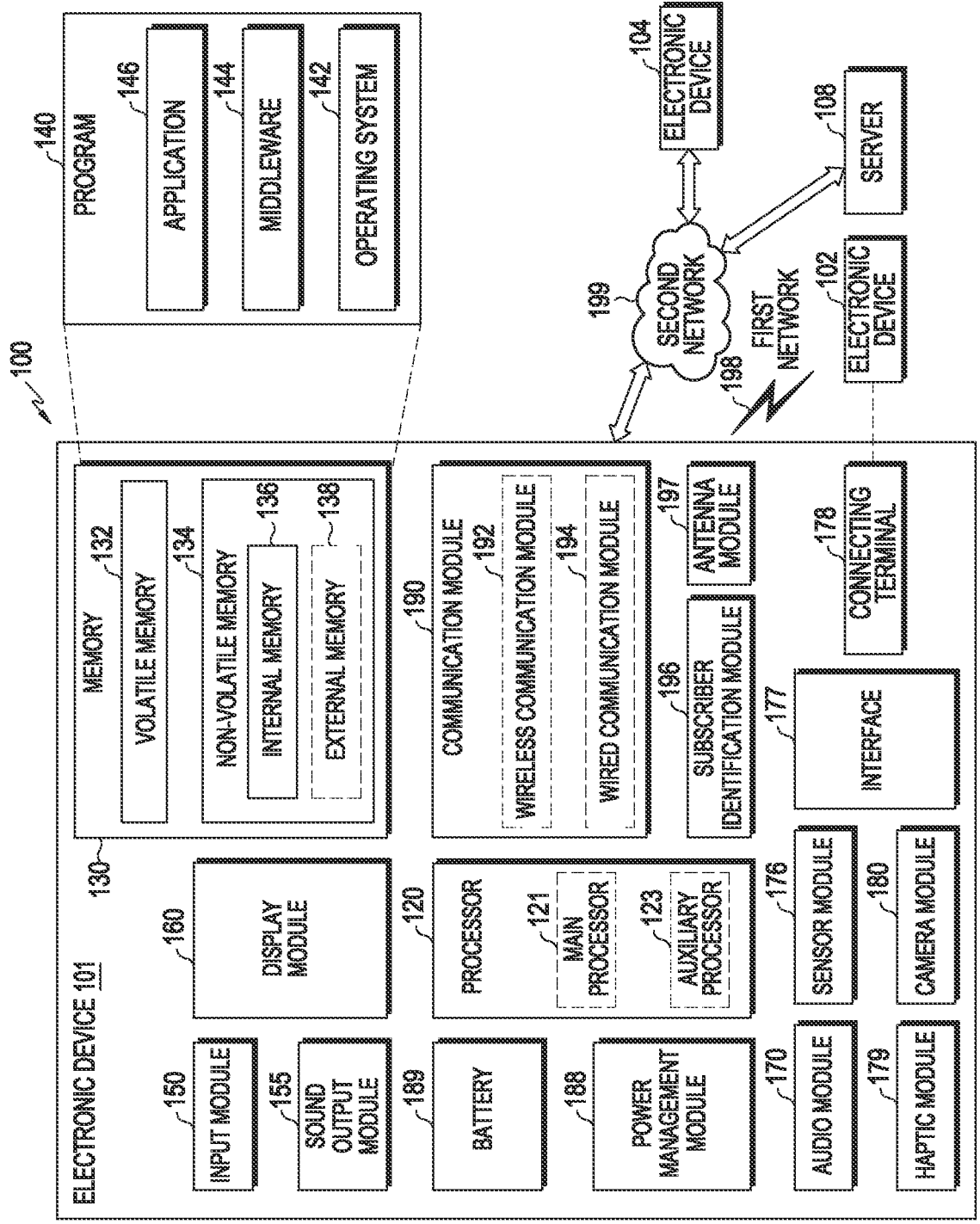
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178. According to an embodiment, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic device 102 or the external electronic device 104 each may be a device of the same or a different type from the electronic device 101. According to an embodiment, all or some of operations to be executed at the electronic device 101 may be executed at one or more of the external electronic device 102, the external electronic device 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
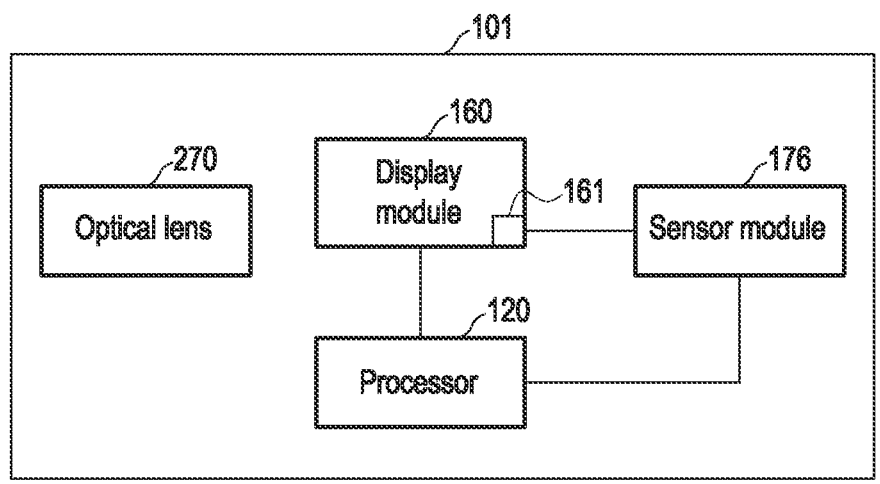
FIG. 2A is a block diagram illustrating an electronic device according to an embodiment of the disclosure.

FIG. 2A is a block diagram illustrating an electronic device according to an embodiment of the disclosure.

Referring to FIG. 2A, an electronic device 101 according to an embodiment may include a processor 120, a display module 160, and/or a sensor module 176. Here, the electronic device 101 may include all or at least some of the components of the electronic device 101 of FIG. 1. In an embodiment, the electronic device 101 may be optical see-through (OST)-type AR glasses (e.g., the wearable electronic device 200 of FIGS. 2B, 2C, and 2D) or video see-through (VST)-type AR glasses (e.g., the wearable electronic device 300 of FIGS. 3A and 3B) as described below, but is not limited thereto.

In an embodiment, the display member (e.g., the display member 201 of FIGS. 2B, 2C, and 2D) of the OST-type AR glass may be implemented as a transparent or semi-transparent lens, and accordingly, the user may directly recognize the external environment through the transparent or semi-transparent lens.

Figure 3A:
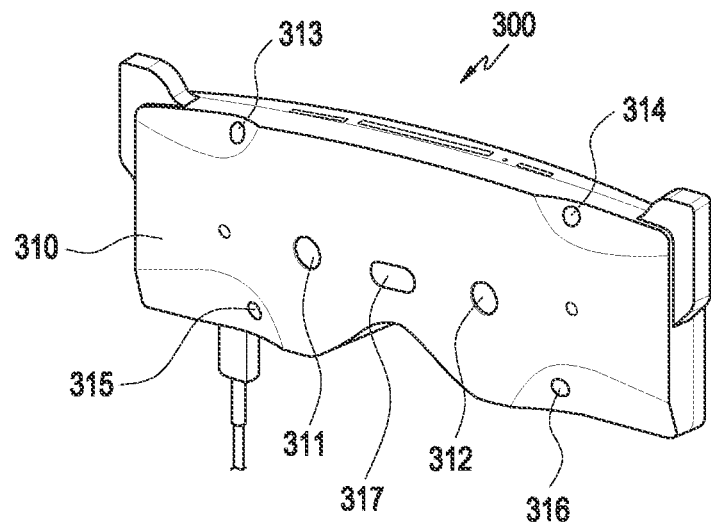
FIGS. 3A and 3B are views illustrating front and rear surfaces of a wearable electronic device according to various embodiments of the disclosure.
Figure 3B:
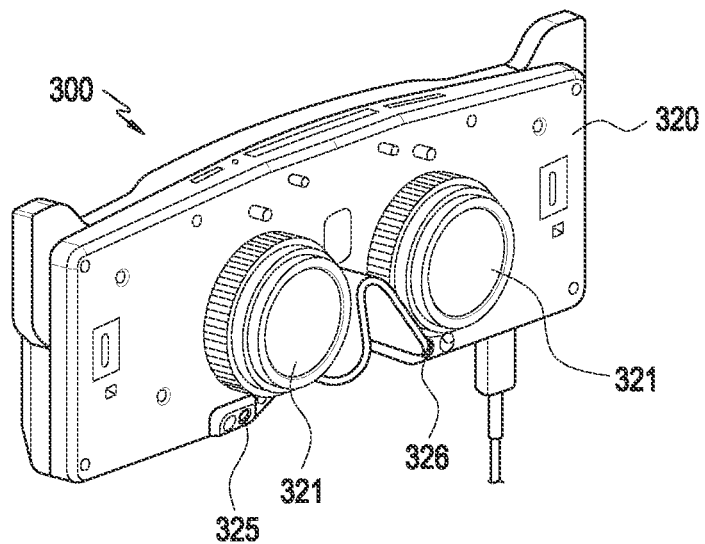

In an embodiment, the VST-type AR glasses may capture the external environment by a camera (not shown) and display the captured external environment image, along with AR content, to the user through the display (e.g., the display 321 of FIGS. 3A and 3B).

In an embodiment, the electronic device 101 may execute an application or command stored in a memory (not illustrated, e.g., the memory 130 of FIG. 1), or may calculate or process input data to output resultant data.

In an embodiment, the electronic device 101 may include a display module 160 that displays visual information to the user on the screen. In an embodiment, the display module 160 may display a screen in front of the user's field of view through the optical lens 270. In an embodiment, the optical lens 270 may be positioned in front of the user's field of view.

In an embodiment, the head-mounted electronic device 101 may consume a large amount of power to collect, process, and display data about the surrounding environment, and the display module 160 may generate a large amount of heat to implement a high resolution in a narrow area. Accordingly, the head-mounted electronic device 101 used while being worn on the user's body may be required to manage heat generation.

In an embodiment, the sensor module 176 may measure the temperature of the display module 160 and may monitor heat generation of the display module 160.

In an embodiment, a thermistor 161 may be disposed on the display module 160, and the sensor module 176 may measure the temperature of the display module 160 using the thermistor 161. In an embodiment, at least one thermistor 161 may be provided and disposed at a specific position of the display module 160, and may measure the temperature of at least a portion of the display module 160.

In an embodiment, the electronic device 101 or the processor 120 may control to the display module to display a designated screen on the display module 160. In an embodiment, the designated screen may be an image captured for an external environment or may be a screen related to AR content displayed by an application or an operation command. For example, the AR content may be content, such as navigation or data related to a specific object.

According to an embodiment, the electronic device 101 or the processor 120 may obtain, from the sensor module 176, at least one temperature respectively corresponding to one or more positions where the thermistor(s) 161 is disposed while displaying a designated screen on the display module 160.

Figure 2B:
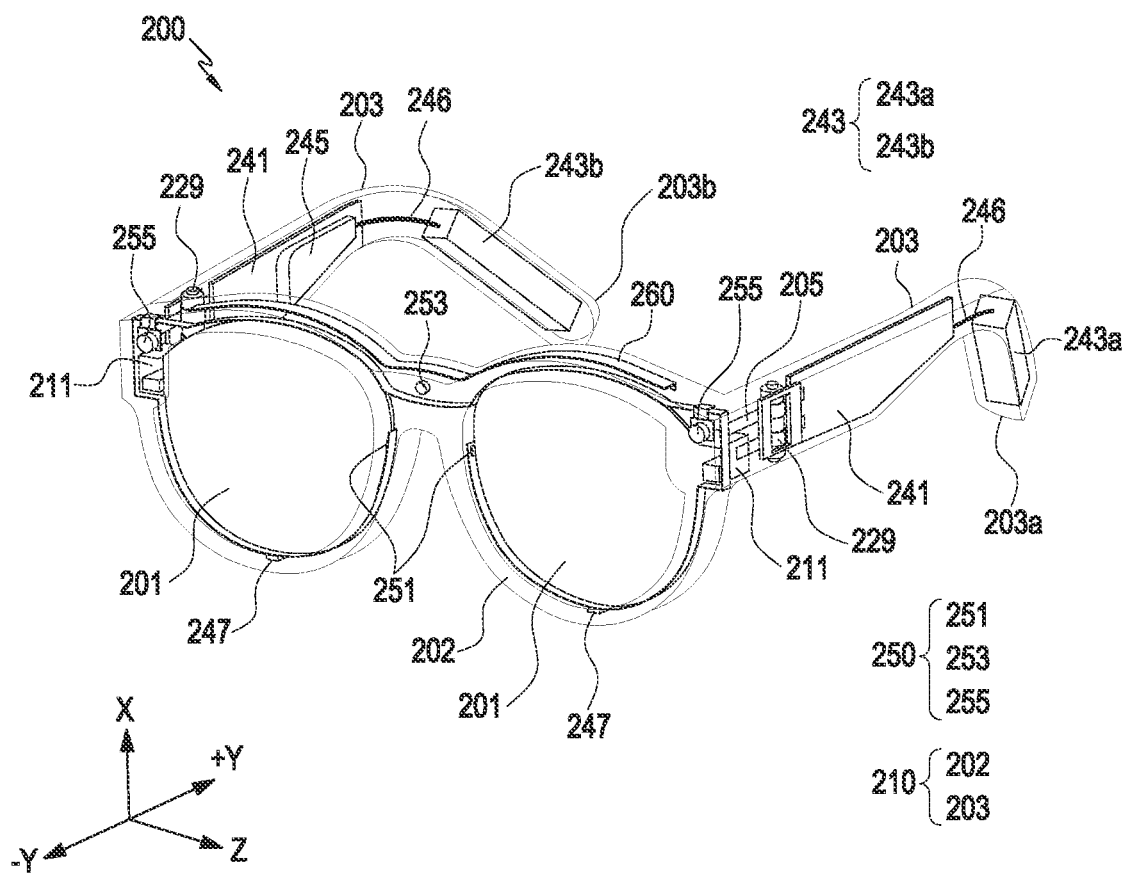
FIG. 2B is a perspective view illustrating an internal configuration of a wearable electronic device according to an embodiment of the disclosure.

FIG. 2B is a perspective view illustrating an internal configuration of a wearable electronic device according to an embodiment of the disclosure.

Figure 2C:
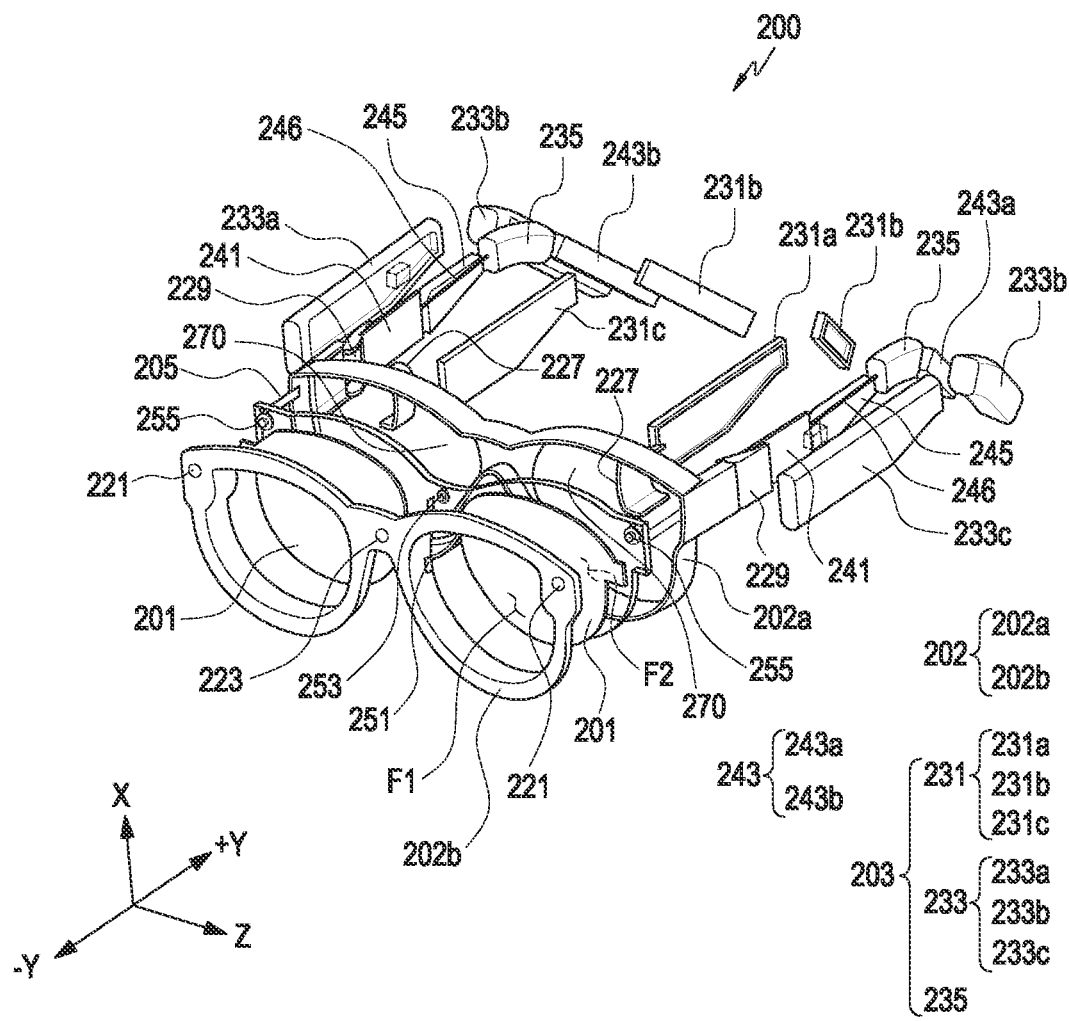
FIG. 2C is an exploded perspective view illustrating a wearable electronic device according to an embodiment of the disclosure.

FIG. 2C is an exploded perspective view illustrating a wearable electronic device according to an embodiment of the disclosure.

Referring to FIGS. 2B and 2C, the wearable electronic device 200 may be a glasses-type electronic device, and the user may visually recognize her surrounding objects or environment while wearing the wearable electronic device 200. For example, the wearable electronic device 200 may be c capable of providing images directly in front of the user's eyes. The configuration of the electronic device 200 of FIGS. 2B and 2C may be identical in whole or at least part to the configuration of the electronic device 101 of FIG. 1.

According to an embodiment, the wearable electronic device 200 may include a housing that forms the exterior of the wearable electronic device 200. The housing 210 may provide a space in which components of the wearable electronic device 200 may be disposed. For example, the housing 210 may include a lens frame 202 and at least one wearing member 203.

According to an embodiment, the wearable electronic device 200 may include a display member 201 capable of providing the user with visual information. For example, the display member 201 may include a module equipped with a lens, a display, a waveguide, and/or a touch circuit. According to an embodiment, the display member 201 may be transparent or semi-transparent. According to an embodiment, the display member 201 may include a semi-transparent glass or a window member (not shown) the light transmittance of which may be adjusted as the coloring concentration is adjusted. According to an embodiment, a pair of display members 201 may be provided and disposed to correspond to the user's left and right eyes, respectively, with the wearable electronic device 200 worn on the user's body.

According to an embodiment, the lens frame 202 may receive at least a portion of the display member 201. For example, the lens frame 202 may surround at least a portion of the display member 201. According to an embodiment, the lens frame 202 may position at least one of the display members 201 to correspond to the user's eye. According to an embodiment, the lens frame 202 may be the rim of a normal eyeglass structure. According to an embodiment, the lens frame 202 may include at least one closed loop surrounding the display devices 201.

According to an embodiment, the wearing members 203 may be extended from the lens frame 202. For example, the wearing members 203 may be extended from ends of the lens frame 202 and, together with the lens frame 202, may be supported and/or positioned on a part (e.g., ears) of the user's body. According to an embodiment, the wearing members 203 may be rotatably coupled to the lens frame 202 through hinge structures 229. According to an embodiment, the wearing member 203 may include an inner side surface 231c of an inner case 231 configured to face the user's body and an outer side surface 233c of an outer case, opposite to the inner side surface.

According to an embodiment, the wearable electronic device 200 may include the hinge structures 229 configured to fold the wearing members 203 on the lens frame 202. The hinge structure 229 may be disposed between the lens frame 202 and the wearing member 203. While the wearable electronic device 200 is not worn, the user may fold the wearing members 203 on the lens frame 202 to carry or store the electronic device.

The wearable electronic device 200 may include components received in the housing 210 (e.g., at least one circuit board 241 (e.g., printed circuit board (PCB), printed board assembly (PBA), flexible PCB, or rigid-flexible PCB (RFPCB)), at least one battery 243, at least one speaker module 245, at least one power transfer structure 246, and a camera module 250).

According to an embodiment, the wearable electronic device 200 may obtain and/or recognize a visual image regarding an object or environment in the direction (e.g., −Y direction) in which the electronic device 200 faces or the direction in which the user gazes, using the camera module 250 (e.g., the camera module 180 of FIG. 1) and may receive information regarding the object or environment from an external electronic device (e.g., the electronic device 102 or 104 or the server 108 of FIG. 1) through a network (e.g., the first network 198 or second network 199 of FIG. 1). In another embodiment, the wearable electronic device 200 may provide the received object- or environment-related information, in the form of an audio or visual form, to the user. The wearable electronic device 200 may provide the received object- or environment-related information, in a visual form, to the user through the display members 201, using the display module (e.g., the display module 160 of FIG. 1). For example, the wearable electronic device 200 may implement augmented reality (AR) by implementing the object- or environment-related information in a visual form and combining it with an actual image of the user's surrounding environment.

According to an embodiment, the display member 201 may include a first surface F1 facing in a direction (e.g., −y direction) in which external light is incident and a second surface F2 facing in a direction (e.g., +y direction) opposite to the first surface F1. With the user wearing the wearable electronic device 200, at least a portion of the light or image coming through the first surface F1 may be incident on the user's left eye and/or right eye through the second surface F2 of the display member 201 disposed to face the user's left eye and/or right eye.

According to an embodiment, the lens frame 202 may include at least two or more frames. For example, the lens frame 202 may include a first frame 202a and a second frame 202b. According to an embodiment, when the user wears the wearable electronic device 200, the first frame 202a may be a frame of the portion facing the user's face, and the second frame 202b may be a portion of the lens frame 202 spaced from the first frame 202a in the gazing direction (e.g., −Y direction) in which the user gazes.

According to an embodiment, the light output module 211 may provide an image and/or video to the user. For example, the light output module 211 may include a display panel (not shown) capable of outputting images and a lens (not shown) corresponding to the user's eye and guiding images to the display member 201. For example, the user may obtain the image output from the display panel of the light output module 211 through the lens of the light output module 211. According to an embodiment, the light output module 211 may include a device configured to display various information. For example, the light output module 211 may include at least one of, e.g., a liquid crystal display (LCD), a digital mirror device (DMD), a liquid crystal on silicon (LCoS), a light emitting diode (LED) on silicon (LEDoS), an organic light emitting diode (OLED), an organic light emitting diodes on silicon (OLEDoS) or micro light emitting diode (micro LED). According to an embodiment, when the light output module 211 and/or the display member 201 includes one of an LCD, a DMD, or an LCOS, the wearable electronic device 200 may include a light output module 211 and/or a light source emitting light to the display area of the display member 201. According to an embodiment, when the light output module 211 and/or the display member 201 may include OLEDs or micro LEDs, the wearable electronic device 200 may provide virtual images to the user without a separate light source.

According to an embodiment, at least a portion of the light output module 211 may be disposed in the housing 210. For example, the light output module 211 may be disposed in the wearing member 203 or the lens frame 202 to correspond to each of the user's right eye and left eye. According to an embodiment, the light output module 211 may be connected to the display member 201 and may provide images to the user through the display member 201.

According to an embodiment, the circuit board 241 may include components for driving the wearable electronic device 200. For example, the circuit board 241 may include at least one integrated circuit chip. Further, at least one of the processor 120, the memory 130, the power management module 188, or the communication module 190 of FIG. 1 may be provided in the integrated circuit chip. According to an embodiment, a circuit board 241 may be disposed in the wearing member 203 of the housing 210. According to an embodiment, the circuit board 241 may be electrically connected to the battery 243 through the power transfer structure 246. According to an embodiment, the circuit board 241 may be connected to the flexible printed circuit board 205 and may transfer electrical signals to the electronic components (e.g., the light output module 211, the camera module 250, and the light emitting unit) of the electronic device through the flexible printed circuit board 205. According to an embodiment, the circuit board 241 may be a circuit board including an interposer.

According to an embodiment, the flexible printed circuit board 205 may be extended from the circuit board 241 through the hinge structure 229 to the inside of the lens frame 202 and may be disposed in at least a portion of the inside of the lens frame 202 around the display member 201.

According to an embodiment, the battery 243 (e.g., the battery 189 of FIG. 1) may be connected with components (e.g., the light output module 211, the circuit board 241, and the speaker module 245, the microphone module 247, and the camera module 250) of the wearable electronic device 200 and may supply power to the components of the wearable electronic device 200.

According to an embodiment, at least a portion of the battery 243 may be disposed in the wearing member 203. According to an embodiment, batteries 243 may be disposed in ends 203a and 203b of the wearing members 203. For example, the batteries 243 may include a first battery 243a disposed in a first end 203a of the wearing member 203 and a second battery 243b disposed in a second end 203b of the wearing member 203.

According to an embodiment, the speaker module 245 (e.g., the audio module 170 or the sound output module 155 of FIG. 1) may convert an electrical signal into sound. At least a portion of the speaker module 245 may be disposed in the wearing member 203 of the housing 210. According to an embodiment, the speaker module 245 may be located in the wearing member 203 to correspond to the user's ear. For example, the speaker module 245 may be disposed between the circuit board 241 and the battery 243.

According to an embodiment, the power transfer structure 246 may transfer the power from the battery 243 to an electronic component (e.g., the light output module 211) of the wearable electronic device 200. For example, the power transfer structure 246 may be electrically connected to the battery 243 and/or the circuit board 241, and the circuit board 241 may transfer the power received through the power transfer structure 246 to the light output module 211. According to an embodiment, the power transfer structure 246 may be connected to the circuit board 241 through the speaker module 245. For example, when the wearable electronic device 200 is viewed from a side (e.g., in the Z-axis direction), the power transfer structure 246 may at least partially overlap the speaker module 245.

According to an embodiment, the power transfer structure 246 may be a component capable of transferring power. For example, the power transfer structure 246 may include a flexible printed circuit board or wiring. For example, the wiring may include a plurality of cables (not shown). In various embodiments, various changes may be made to the shape of the power transfer structure 246 considering the number and/or type of the cables.

According to an embodiment, the microphone module 247 (e.g., the input module 150 and/or the audio module 170 of FIG. 1) may convert a sound into an electrical signal. According to an embodiment, the microphone module 247 may be disposed in at least a portion of the lens frame 202. For example, at least one microphone module 247 may be disposed on a lower end (e.g., in the −X-axis direction) and/or on an upper end (e.g., in the X-axis direction) of the wearable electronic device 200. According to an embodiment, the wearable electronic device 200 may more clearly recognize the user's voice using voice information (e.g., sound) obtained by the at least one microphone module 247. For example, the wearable electronic device 200 may distinguish the voice information from the ambient noise based on the obtained voice information and/or additional information (e.g., low-frequency vibration of the user's skin and bones). For example, the wearable electronic device 200 may clearly recognize the user's voice and may perform a function of reducing ambient noise (e.g., noise canceling).

According to an embodiment, the camera module 250 may capture a still image and/or a video. The camera module 250 may include at least one of a lens, at least one image sensor, an image signal processor, or a flash. According to an embodiment, the camera module 250 may be disposed in the lens frame 202 and may be disposed around the display member 201.

According to an embodiment, the camera module 250 may include at least one first camera module 251. According to an embodiment, the first camera module 251 may capture the trajectory of the user's eye (e.g., a pupil) or gaze. For example, the first camera module 251 may capture the reflection pattern of the light emitted by the light emitting unit to the user's eyes. For example, the light emitting unit may emit light in an infrared band for tracking the trajectory of the gaze using the first camera module 251. For example, the light emitting unit may include an IR LED. According to an embodiment, the processor (e.g., the processor 120 of FIG. 1) may adjust the position of the virtual image so that the virtual image projected on the display member 201 corresponds to the direction in which the user's pupil gazes. According to an embodiment, the first camera module 251 may include a global shutter (GS)-type camera. It is possible to track the trajectory of the user's eyes or gaze using a plurality of third camera modules 251 having the same specifications and performance.

According to an embodiment, the first camera module 251 may periodically or a periodically transmit information related to the trajectory of the user's eye or gaze (e.g., trajectory information) to the processor (e.g., the processor 120 of FIG. 1). According to an embodiment, when the first camera module 251 detects a change in the user's gaze based on the trajectory information (e.g., when the user's eyes move more than a reference value with the head positioned still), the first camera module 251 may transmit the trajectory information to the processor.

According to an embodiment, the camera modules 250 may include at least one second camera module 253. According to an embodiment, the second camera module 253 may capture an external image. According to an embodiment, the second camera module 253 may be a global shutter-type or rolling shutter (RS)-type camera. According to an embodiment, the second camera module 253 may capture an external image through the second optical hole 223 formed in the second frame 202b. For example, the second camera module 253 may include a high-resolution color camera, and it may be a high resolution (HR) or photo video (PV) camera. Further, the second camera module 253 may provide an auto-focus (AF) function and an optical image stabilizer (OIS) function. The second camera module 253 according to an embodiment of the disclosure may include one or more cameras.

According to an embodiment, the wearable electronic device 200 may include a flash (not shown) positioned adjacent to the second camera module 253. For example, the flash (not shown) may provide light for increasing brightness (e.g., illuminance) around the wearable electronic device 200 when an external image is obtained by the second camera module 253, thereby reducing difficulty in obtaining an image due to the dark environment, the mixing of various light beams, and/or the reflection of light.

According to an embodiment, the camera modules 250 may include at least one third camera module 255. According to an embodiment, the third camera module 255 may capture the user's motion through a first optical hole 221 formed in the lens frame 202. For example, the third camera module 255 may capture the user's gesture (e.g., hand gesture). Third camera modules 255 and/or first optical holes 221 may be disposed on two opposite sides of the lens frame 202 (e.g., the second frame 202b), e.g., formed in two opposite ends of the lens frame 202 (e.g., the second frame 202b) with respect to the X direction. According to an embodiment, the third camera module 255 may be a global shutter (GS)-type camera. For example, the third camera module 255 may be a camera supporting 3DoF (degrees of freedom) or 6DoF, which may provide position recognition and/or motion recognition in a 360-degree space (e.g., omni-directionally). According to an embodiment, the third camera modules 255 may be stereo cameras and may perform the functions of simultaneous localization and mapping (SLAM) and user motion recognition using a plurality of global shutter-type cameras with the same specifications and performance. According to an embodiment, the third camera module 255 may include an infrared (IR) camera (e.g., a time of flight (TOF) camera or a structured light camera). For example, the IR camera may be operated as at least a portion of a sensor module (e.g., the sensor module 176 of FIG. 1) for detecting a distance from the subject.

According to an embodiment, at least one of the first camera module 251 to the third camera module 255 may be replaced with a sensor module (e.g., the sensor module 176 of FIG. 1) (e.g., lidar sensor). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be referred to as a photo detector or a photo sensor.

According to an embodiment, at least one of the first camera module 251, the second camera module 253, and the third camera module 255 may include a plurality of camera modules (not shown). For example, the second camera module 253 may include a plurality of lenses (e.g., wide-angle and telephoto lenses) and image sensors and may be disposed on one surface (e.g., a surface facing in the −Y axis) of the wearable electronic device 200. For example, the wearable electronic device 200 may include a plurality of camera modules having different properties (e.g., angle of view) or functions and control to change the angle of view of the camera module based on the user's selection and/or trajectory information. At least one of the plurality of camera modules may be a wide-angle camera and at least another of the plurality of camera modules may form a telephoto camera.

According to an embodiment, the processor (e.g., processor 120 of FIG. 1) may determine the motion of the wearable electronic device 200 and/or the user's motion using information about the wearable electronic device 200 obtained using at least one of a gesture sensor, a gyro sensor, or an acceleration sensor of the sensor module (e.g., the sensor module 176 of FIG. 1) and the user's action (e.g., approach of the user's body to the wearable electronic device 200) obtained using the first camera module 251. According to an embodiment, in addition to the above-described sensor, the wearable electronic device 200 may include a magnetic (geomagnetic) sensor capable of measuring an orientation using a magnetic field and magnetic force lines and/or a hall sensor capable of obtaining motion information (e.g., moving direction or distance) using the strength of a magnetic field. For example, the processor may determine the motion of the wearable electronic device 200 and/or the user's motion based on information obtained from the magnetic (geomagnetic) sensor and/or the hall sensor.

According to an embodiment, the wearable electronic device 200 may perform an input function (e.g., a touch and/or pressure sensing function) capable of interacting with the user. For example, a component configured to perform a touch and/or pressure sensing function (e.g., a touch sensor and/or a pressure sensor) may be disposed in at least a portion of the wearing member 203. The wearable electronic device 200 may control the virtual image output through the display member 201 based on the information obtained through the components. For example, a sensor associated with a touch and/or pressure sensing function may be configured in various types, e.g., a resistive type, a capacitive type, an electro-magnetic (EM) type, or an optical type. According to an embodiment, the component configured to perform the touch and/or pressure sensing function may be identical in whole or part to the configuration of the input module 150 of FIG. 1.

According to an embodiment, the wearable electronic device 200 may including a reinforcing member 260 that is disposed in an inner space of the lens frame 202 and formed to have a higher rigidity than that of the lens frame 202.

According to an embodiment, the wearable electronic device 200 may include a lens structure 270. The lens structure 270 may refract at least a portion of light. For example, the lens structure 270 may be a prescription lens having a predesignated refractive power. According to an embodiment, the lens structure 270 may be disposed behind (e.g., +Y direction) of the display member 201. For example, the lens structure 270 may be positioned between the display member 201 and the user's eye. For example, the lens structure 270 may face one surface of the display member 201.

According to an embodiment, the housing 210 may include a hinge cover 227 that may conceal a portion of the hinge structure 229. Another part of the hinge structure 229 may be received or hidden between an inner case 231 and an outer case 233, which are described below.

According to an embodiment, the wearing member 203 may include the inner case 231 and the outer case 233. The inner case 231 may be, e.g., a case configured to face the user's body or directly contact the user's body, and may be formed of a material having low thermal conductivity, e.g., a synthetic resin. According to an embodiment, the inner case 231 may include an inner side surface (e.g., the inner side surface 231c of FIG. 2A) facing the user's body. The outer case 233 may include, e.g., a material (e.g., a metal) capable of at least partially transferring heat and may be coupled to the inner case 231 to face each other. According to an embodiment, the outer case 233 may include an outer side surface 233c opposite to the inner side surface 231c. In an embodiment, at least one of the circuit board 241 or the speaker module 245 may be received in a space separated from the battery 243 in the wearing member 203. In the illustrated embodiment, the inner case 231 may include a first case 231a including the circuit board 241 or the speaker module 245 and a second case 231b receiving the battery 243, and the outer case 233 may include a third case 233a coupled to face the first case 231a and a fourth case 233b coupled to face the second case 231b. For example, the first case 231a and the third case 233a may be coupled (hereinafter, 'first case portions 231a and 233a') to receive the circuit board 241 and/or the speaker module 245, and the second case 231b and the fourth case 233b may be coupled (hereinafter, 'second case portions 231b and 233b') to receive the battery 343.

According to an embodiment, the first case portions 231a and 233a may be rotatably coupled to the lens frame 202 through the hinge structure 229, and the second case portions 231b and 233b may be connected or mounted to the ends of the first case portions 231a and 233a through the connecting member 235. In some embodiments, a portion of the connecting member 235 in contact with the user's body may be formed of a material having low thermal conductivity, e.g., an elastic material, such as silicone, polyurethane, or rubber, and another portion thereof which does not come into contact with the user's body may be formed of a material having high thermal conductivity (e.g., a metal). For example, when heat is generated from the circuit board 241 or the battery 243, the connecting member 235 may block heat transfer to the portion in contact with the user's body while dissipating or discharging heat through the portion not in contact with the user's body. According to an embodiment, a portion of the connecting member 235 configured to come into contact with the user's body may be interpreted as a portion of the inner case 231, and a portion of the connecting member 235 that does not come into contact with the user's body may be interpreted as a portion of the outer case 233. According to an embodiment (not shown), the first case 231a and the second case 231b may be integrally configured without the connecting member 235, and the third case 233a and the fourth case 233b may be integrally configured without the connecting member 235. According to an embodiment, other components (e.g., the antenna module 197 of FIG. 1) may be further included in addition to the illustrated components, and information regarding an object or environment may be received from an external electronic device (e.g., the electronic device 102 or 104 or server 108 of FIG. 1) through a network (e.g., the first network 198 or second network 199 of FIG. 1) using the communication module 190.

Figure 2D:
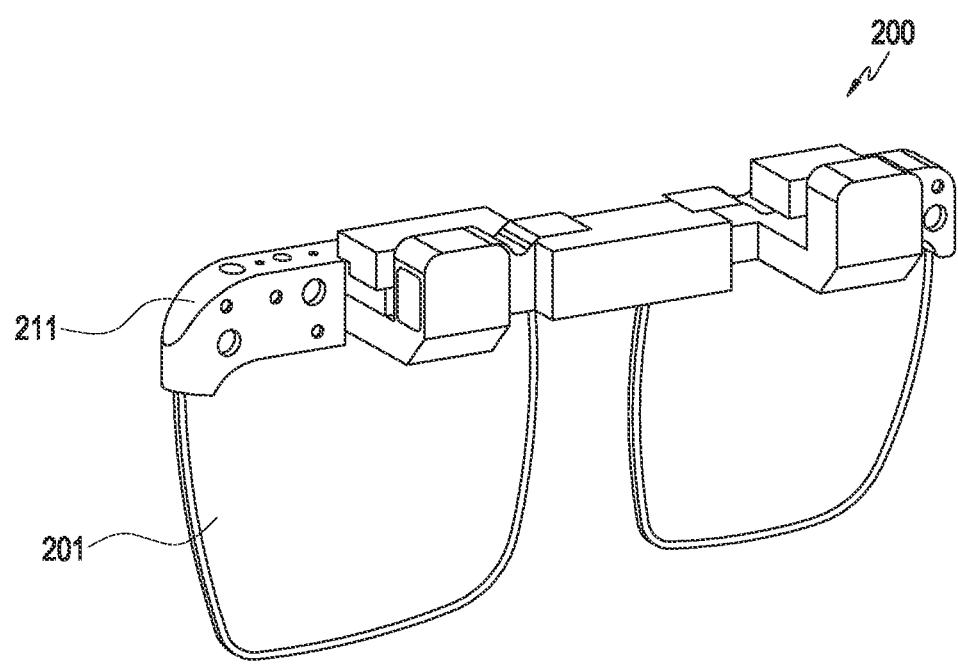
FIG. 2D is a rear perspective view illustrating a wearable electronic device according to an embodiment of the disclosure.

FIG. 2D is a rear perspective view illustrating a wearable electronic device according to an embodiment of the disclosure.

Referring to FIG. 2D, a wearable electronic device 200 according to an embodiment may have a light output module 211 on an upper end of a display member 201 including a module where a lens, a display, a waveguide, and/or a touch circuit is mounted.

In an embodiment, the light output module 211 may be a display engine that displays a screen on a transparent or semi-transparent display member 201 positioned in front of the user's field of view and may display screens corresponding to AR content on the display members 201 respectively corresponding to the left and right eyes of the user.

In an embodiment, the sensor module 176 may measure the temperature of the light output module 211 or monitor heat generation. In an embodiment, based on the temperature of the light output module 211 measured by the sensor module 176, the wearable electronic device 200 displays a screen on the monocular display member 201 when the temperature is a designated temperature or more. In an embodiment, the wearable electronic device 200 may alternately display screens on the display members 201 respectively corresponding to the left and right eyes.

Further, the design and mounting structure of the light output module 211 of the wearable electronic device 200 are not limited and may be applied in various ways.

Although only the wearable electronic device 200 is illustrated and described in FIGS. 2B to 2D, the disclosure is not limited thereto, and some components of the wearable electronic device 200 illustrated in FIGS. 2B to 2D may be included in electronic devices, such as smartphones and tablet PCs.

FIGS. 3A and 3B are views illustrating front and rear surfaces of a wearable electronic device according to various embodiments of the disclosure.

Referring to FIGS. 3A and 3B, in an embodiment, camera modules 311, 312, 313, 314, 315, and 316 and/or a depth sensor 317 for obtaining information related to the ambient environment of the wearable electronic device 300 may be disposed on the first surface 310 of the housing.

In an embodiment, the camera modules 311 and 312 may obtain images related to the ambient environment of the wearable electronic device 300.

In an embodiment, the camera modules 313, 314, 315, and 316 may obtain images while the wearable electronic device 300 is worn by the user. The camera modules 313, 314, 315, and 316 may be used for hand detection, tracking, and recognition of the user gesture (e.g., hand motion). The camera modules 313, 314, 315, and 316 may be used for 3DoF or 6DoF head tracking, location (space or environment) recognition, and/or movement recognition. In an embodiment, the camera modules 311 and 312 may be used for hand detection and tracking and recognition of the user's gesture.

In an embodiment, the depth sensor 317 may be configured to transmit a signal and receive a signal reflected from an object and be used for identifying the distance to the object, such as time of flight (TOF).

According to an embodiment, camera modules 325 and 326 for face recognition and/or a display 321 (and/or lens) may be disposed on the second surface 320 of the housing.

In an embodiment, the face recognition camera modules 325 and 326 adjacent to the display may be used for recognizing the user's face or may recognize and/or track both eyes of the user.

In an embodiment, the display 321 (and/or lens) may be disposed on the second surface 320 of the wearable electronic device 300. In an embodiment, the wearable electronic device 300 may not include some camera modules 315 and 316 among the plurality of camera modules 313, 314, 315, and 316. Although not shown in FIGS. 3A and 3B, the wearable electronic device 300 may further include at least one of the components shown in FIGS. 2B to 2D.

As described above, according to an embodiment, the wearable electronic device 300 may have a form factor to be worn on the user's head. The wearable electronic device 300 may further include a strap and/or a wearing member to be fixed on the user's body part. The wearable electronic device 300 may provide the user experience based on augmented reality, virtual reality, and/or mixed reality while worn on the user's head.

Figure 3C:
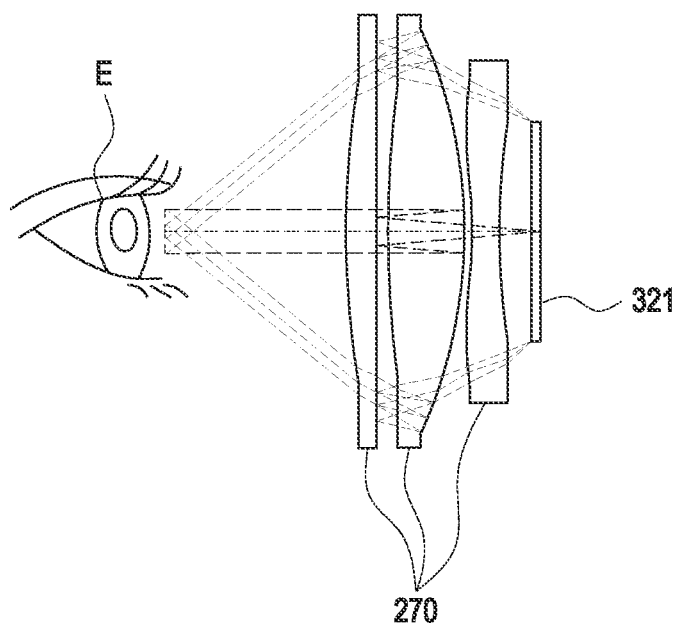
FIG. 3C illustrates a state in which a screen displayed on a display is transferred to a user's eyes according to an embodiment of the disclosure.

FIG. 3C illustrates a state in which a screen displayed on a display according to an embodiment of the disclosure is transferred to a user's eye E.

Referring to FIG. 3C, the display 321 according to an embodiment may be positioned in front of the user's eye E. In an embodiment, at least one optical lens 270 (e.g., the optical lens 270 of FIG. 2A) may be disposed between the user's eye E and the display 321. In an embodiment, the optical lens 270 may be a pancake lens having a reduced thickness to have a small protruding portion. In an embodiment, the optical lens 270 may include a plurality of lenses, and may include a Fresnel lens, a pancake lens, a multichannel lens, and/or any other suitable lenses.

In an embodiment, the optical lens 270 is a component for leading to refraction of light output from the display 321. The optical lens 270 may lead to refraction of light so that light generated and output from the display 321 displaying a screen may form an image on the user's eye E. In an embodiment, the light output from the display 321 may be incident on the user's eye E through the at least one optical lens 270 by dispersion, reflection, or refraction.

In an embodiment, as the light output from the display 321 is incident on the user's eye E through the optical lens 270, the transfer efficiency of the light may be reduced (e.g., about 10%). In an embodiment, since the display 321 is required to display a screen having a high resolution in a relatively small area, the display 321 may be required to output light having a high luminance. Accordingly, the current consumption in the display 321 may increase, and accordingly, heat generation may occur, thereby increasing the temperature.

Figure 4:
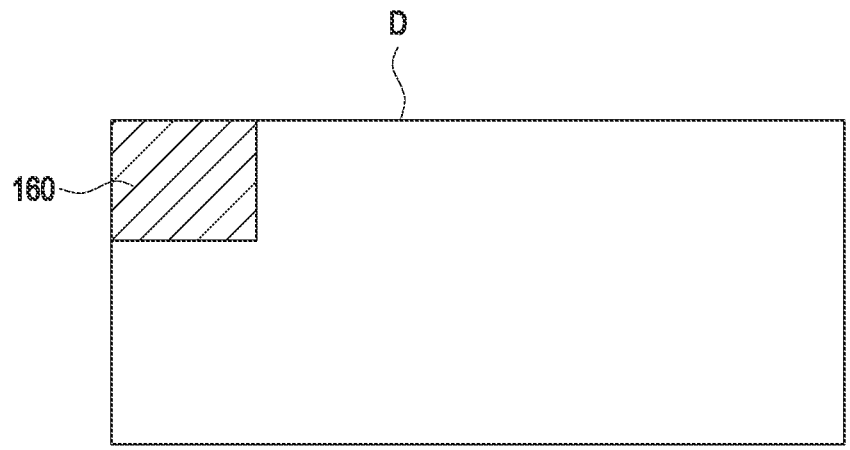
FIG. 4 illustrates a size of a display of an electronic device different from a display module according to an embodiment of the disclosure.

FIG. 4 illustrates a size of a display of an electronic device different from a display module according to an embodiment of the disclosure.

Referring to FIG. 4, the area of the display module 160 (e.g., the display member 201 of FIG. 2B or the display 321 of FIG. 3B) of the electronic device (e.g., the wearable electronic device 200 of FIGS. 2B to 2D or the wearable electronic device 300 of FIGS. 3A to 3B) according to an embodiment may be about 10% of the area of the display D of another electronic device (e.g., a smartphone).

In an embodiment, to display a high-resolution screen in a relatively narrow area, the display module 160 may increase the luminance and/or current consumption of the displayed screen. Further, since the display module 160 having a relatively narrow area also has a reduced contact area with a heat dissipation member (not shown), it may be difficult to obtain a sufficient heat dissipation effect. Accordingly, heat may be generated in the display module 160 according to an embodiment, or the display module 160 may be exposed to a high temperature.

Figure 5A:
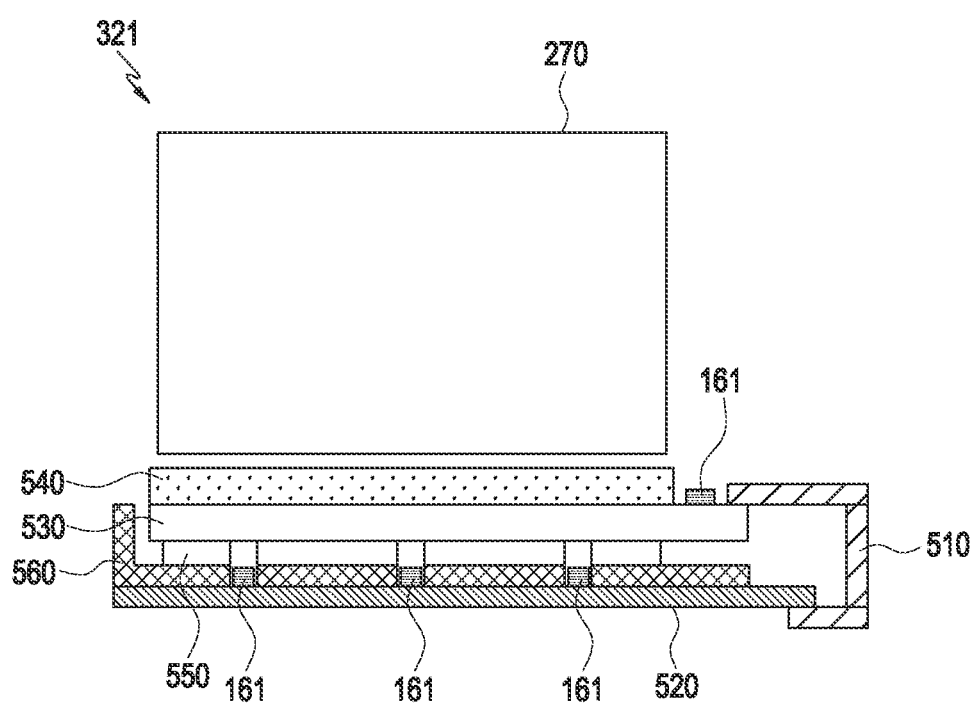
FIG. 5A is a cross-sectional view illustrating a display according to an embodiment of the disclosure.

FIG. 5A is a cross-sectional view illustrating a display according to an embodiment of the disclosure.

Figure 5B:
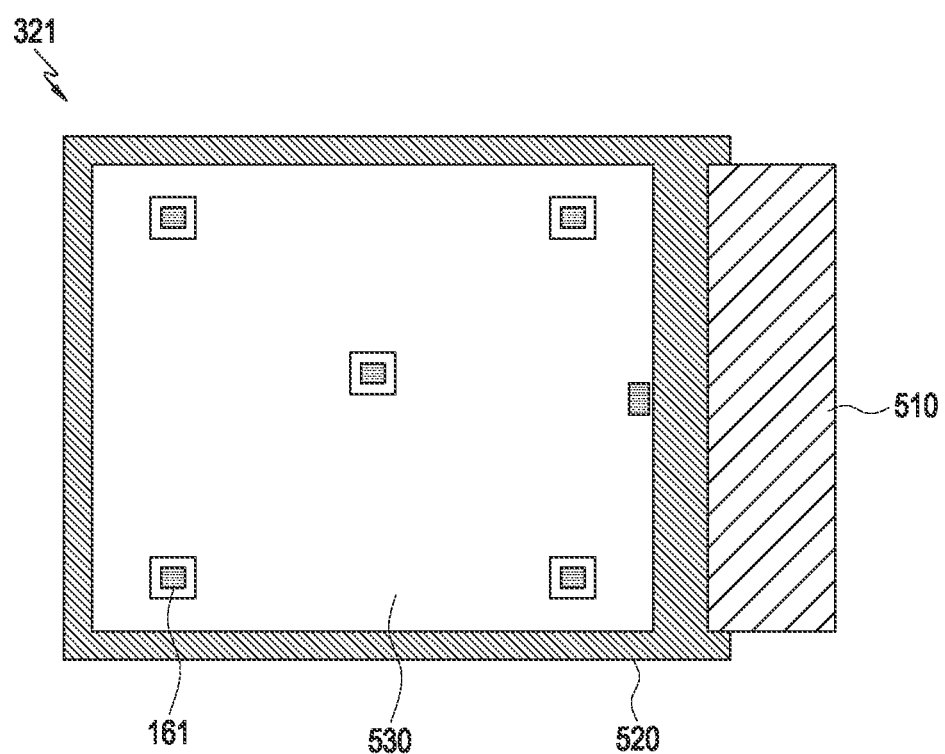
FIG. 5B is a plan view illustrating a display according to an embodiment of the disclosure.

FIG. 5B is a plan view illustrating a display according to an embodiment of the disclosure.

Referring to FIGS. 5A and 5B, the display 321 according to an embodiment may be implemented as organic light emitting diodes on silicon (OLEDoS).

In the display 321 according to an embodiment, pixels and driving units may be formed on a silicon panel 530, and OLEDs as light emitting units may be implemented thereon. In an embodiment, a glass plate 540 may be formed on the upper surface of the silicon panel 530, and a metal plate 560 (SUS plate) may be formed on the lower surface of the silicon panel 530. In an embodiment, light of the display 321 emitted through the glass plate 540 may be incident on the optical lens 270. In an embodiment, a thermal interface material (TIM) 550 may be interposed between the silicon panel 530 and the metal plate 560, and accordingly, heat generated from the silicon panel 530 may be transferred to the metal plate 560 and dissipated to the outside.

According to an embodiment, the thermistor 161 may be disposed on at least a portion of the display 321 or the silicon panel 530. According to an embodiment, an electronic device (e.g., the electronic device 101 of FIG. 1) or a sensor module (e.g., the sensor module 176) may monitor temperature or heat of the display 321 or the silicon panel 530.

In an embodiment, the thermistor 161 may be provided on the main flexible printed circuit board 510 and may be disposed on at least a portion of the silicon panel 530. In an embodiment, the thermistor 161 provided on the main flexible printed circuit board 510 may measure a temperature at a specific position of the silicon panel 530 and may be directly connected to the silicon panel 530.

In an embodiment, the at least one thermistor 161 may be provided on a bridge flexible printed circuit board 520 extended from a lower surface of the silicon panel 530 to the silicon panel 530 in a substantially planar direction. In an embodiment, the at least one thermistor 161 may be disposed to be spaced apart from each other on the bridge flexible circuit board 520 extended in the planar direction. In an embodiment, the thermistor 161 may be provided on the bridge flexible printed circuit board 520 and may be connected to the silicon panel 530 through a penetrated area of the metal plate 560 and/or the thermal interface material 550, or may be (e.g., thermally) connected to indirectly transfer heat to the silicon panel 530 through the thermal interface material 550.

In an embodiment, the thermistors 161 may be spaced apart from each other in the planar direction of the silicon panel 530 or the main flexible printed circuit board 510, and for example, the thermistors 161 may be spaced apart from each other in the upper and lower and left and right directions of the silicon panel 530 or the main flexible printed circuit board 510. In an embodiment, the thermistors 161 respectively may be disposed in at least a partial area of the silicon panel 530 or the main flexible printed circuit board 510, and the electronic device (e.g., the electronic device 101 of FIG. 1) or the sensor module (e.g., the sensor module 176) may obtain a temperature corresponding to each area of the silicon panel 530 or the main flexible printed circuit board 510 through the thermistors 161 respectively disposed in at least the partial area.

In an embodiment, the electronic device (e.g., the electronic device 101 of FIG. 1) or the sensor module (e.g., the sensor module 176) may obtain the overall (e.g., average) temperature and/or local temperature distribution of the silicon panel 530 or the display 321 extended in the planar direction, based on the temperature of the at least one thermistor 161 spaced apart from each other.

Figure 6:
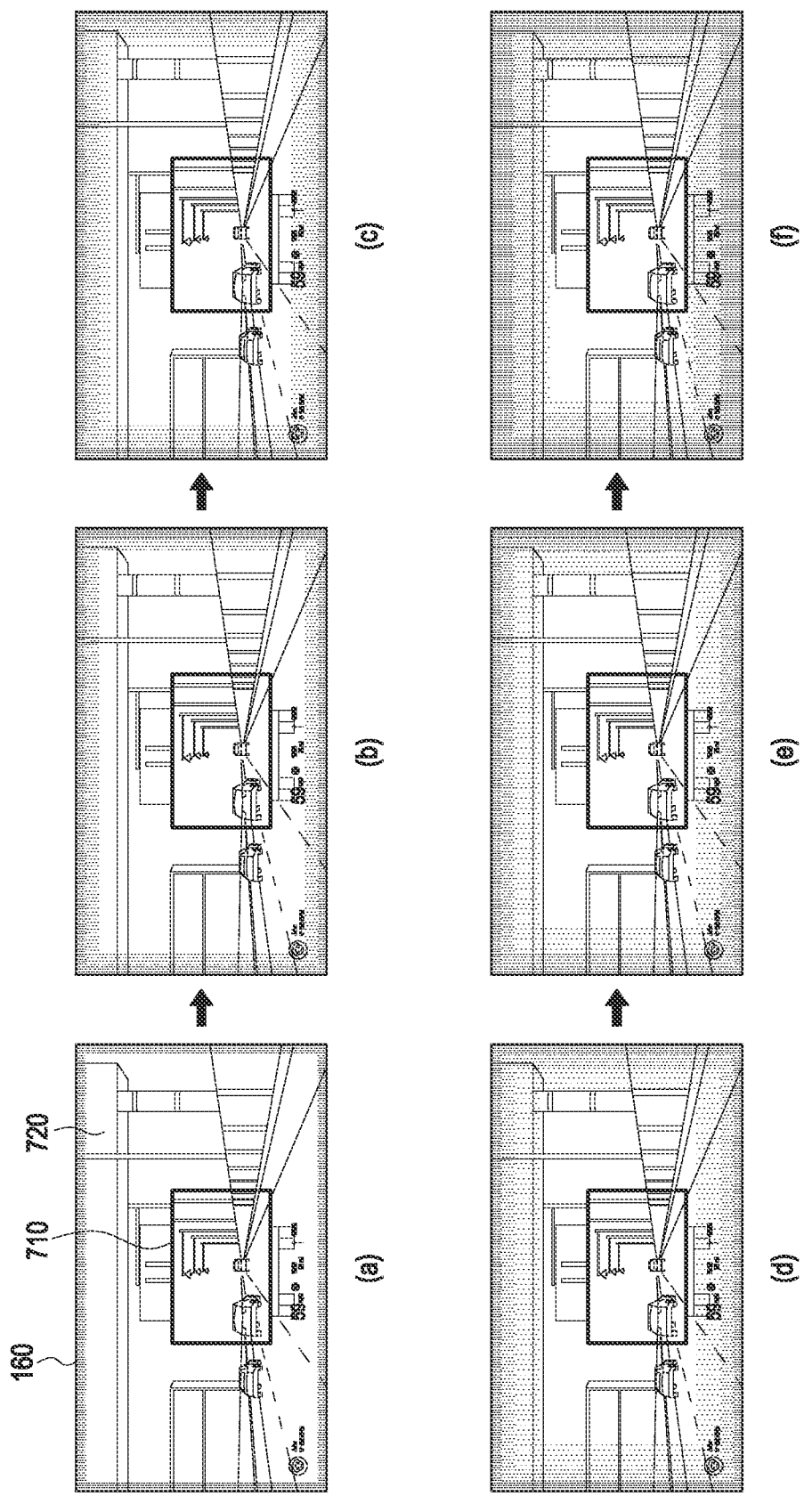
FIG. 6 illustrates a state of gradually increasing the luminance of a part of a screen displayed on a display module according to an embodiment of the disclosure.

FIG. 6 illustrates a state of gradually increasing the luminance of a part of a screen displayed on a display module according to an embodiment of the disclosure.

Referring to FIG. 6, in an embodiment, the electronic device (e.g., the electronic device 101 or the processor 120 of FIG. 1) may control the display module 160 (e.g., the display member 201 of FIG. 2B or the display 321 of FIG. 3B) in various operation modes. In an embodiment, the electronic device 101 may adjust the luminance of the display screen according to the temperature of the display module 160, based on various operation modes.

In an embodiment, in the first mode (e.g., performance mode), the electronic device 101 may control screen display of the display module 160 without any limitation. Even if the temperature of the display module 160 rises in the performance mode, the electronic device 101 may maintain the display screen of the display module 160 without changing the luminance or the display screen as described below.

In an embodiment, in the second mode (e.g., normal mode), the electronic device 101 may control screen display of the display module 160 without any limitation, but may change the luminance of at least a part or may change the display area, based on the temperature of the display module 160. In other words, as is described below in the normal mode, when the temperature of the display module 160 increases, the electronic device 101 may change the luminance of at least a part or may change the display area.

In an embodiment, in the third mode (e.g., dynamic optimization mode), the electronic device 101 may apply a dark blur effect to at least a portion of the outer area 720 positioned outside the gaze area 710 of the display module 160.

In an embodiment, in the fourth mode (e.g., power saving mode), the electronic device 101 may apply a dark blur effect to at least a portion of the outer area 720 positioned outside the gaze area 710, set a ratio of at least the portion to which the dark blur effect is applied to the outer area 720 to a designated ratio, and apply the dark blur effect at a relatively low level.

In an embodiment, in the fifth mode (e.g., ultra power saving mode), the electronic device 101 may apply a dark blur effect to at least a portion of the outer area 720 positioned outside the gaze area 710, relatively increase the ratio of at least the portion to which the dark blur effect is applied to the outer area 720, and apply the dark blur effect at a relatively high level. For example, the electronic device 101 may display a screen with a lower luminance for the outer area 720 positioned outside the gaze area 710.

The electronic device 101 according to an embodiment may change the luminance of at least a part of a designated screen or may change the display area of the display module 160, based on the temperature of the display module 160.

In an embodiment, the electronic device 101 may reduce luminance of the outer area 720 positioned outside the user's gaze area 710, based on the temperature of the display module 160. In an embodiment, the electronic device 101 may reduce the luminance of the entire display screen of the display module 160 including the gaze area 710, or may reduce the luminance of at least a portion of the outer area 720 positioned outside the gaze area 710 while maintaining the luminance of the gaze area 710.

In an embodiment, the user's gaze area 710 may be designated as a specific area (e.g., a central portion) of the display module 160. In an embodiment, the user's gaze area 710 may be set according to the user's gaze estimated based on the user's pupil position obtained through a camera (e.g., the first camera module 251 of FIG. 2B or the face recognition camera modules 325 and 326 of FIG. 3B) that captures the user's eye.

In an embodiment, the electronic device 101 may reduce luminance of the outer area 720 positioned outside the gaze area 710, based on the temperature of the display module 160. In an embodiment, when the temperature of the display module 160 is less than the designated temperature, the electronic device 101 may maintain the luminance of the displayed screen (e.g., shown in part (a) of FIG. 6).

In an embodiment, the electronic device 101 may apply a dark blur effect to the outer area 720 positioned outside the gaze area 710. In an embodiment, as illustrated in parts (a), (b), (c), (d), (e), and (f) of FIG. 6, the electronic device 101 may apply a dark blur effect to the outer area 720 positioned outside the gaze area 710, thereby gradually reducing the luminance of the outer area 720 according to being distanced from the gaze area 710.

In an embodiment, the electronic device 101 may gradually reduce the luminance of the outer area 720 according to being distanced from the gaze area 710 from the outer area 720 while maintaining the luminance of the gaze area 710. For example, the outer edge of the outer area 720 to which the dark blur effect is applied may have a luminance of 0 (e.g., a state in which a screen is not displayed), and the inner edge of the outer area 720 to which the dark blur effect is applied adjacent to the gaze area 710 may maintain luminance together with the gaze area 710.

In an embodiment, when the temperature of the display module 160 is greater than or equal to a designated temperature, the electronic device 101 may apply a dark blur effect of reducing luminance to at least a portion of the outer area 720, and may expand the area to which the dark blur effect is applied, e.g., as the temperature of the display module 160 increases. Further, in an embodiment, as the temperature of the display module 160 increases, the electronic device 101 may further reduce luminance by increasing the intensity of the dark blur effect on at least a portion of the outer area 720.

In an embodiment, when the temperature of the display module 160 is less than the designated temperature, the electronic device 101 may maintain luminance of the area corresponding to 100% of the outer area 720 without applying a dark blur effect, as illustrated in part (a) of FIG. 6. In an embodiment, when the temperature of the display module 160 is greater than or equal to the designated temperature, the electronic device 101 may apply a dark blur effect of reducing luminance of at least a portion of the outer area 720, as illustrated in parts (a), (b), (c), (d), (e), and (f) of FIG. 6.

In an embodiment, as illustrated in part (b) of FIG. 6, the electronic device 101 may apply a dark blur effect to only the remaining 10% while maintaining luminance for the area corresponding to 90% of the outer area 720.

In an embodiment, as illustrated in part (c) of FIG. 6, the electronic device 101 may apply a dark blur effect to only the remaining 20% while maintaining luminance for the area corresponding to 80% of the outer area 720.

In an embodiment, as illustrated in part (d) of FIG. 6, the electronic device 101 may apply a dark blur effect to only the remaining 30% while maintaining luminance for the area corresponding to 70% of the outer area 720.

In an embodiment, as illustrated in part (e) of FIG. 6, the electronic device 101 may apply a dark blur effect to only the remaining 40% while maintaining luminance for the area corresponding to 60% of the outer area 720.

In an embodiment, as illustrated in part (f) of FIG. 6, the electronic device 101 may apply a dark blur effect to only the remaining 50% while maintaining luminance for the area corresponding to 50% of the outer area 720.

In an embodiment, in the first mode (e.g., performance mode) of controlling the screen display of the display module 160 without any limitation, the electronic device 101 may not apply the dark blur effect as shown in parts (b) to (f) of FIG. 6, and may maintain luminance for the area corresponding to 100% of the outer area 720 as shown in part (a) of FIG. 6. In an embodiment, the electronic device 101 may apply a dark blur effect as shown in parts (b) to (f) of FIG. 6, based on the temperature of the display module 160 in the second mode (e.g., normal mode). In an embodiment, the electronic device 101 may apply a dark blur effect to correspond to the third mode (e.g., dynamic optimization mode), the fourth mode (e.g., power saving mode), and/or the fifth mode (e.g., ultra power saving mode) depending on the temperature of the display module 160. In an embodiment, the electronic device 101 may measure the illuminance of the external environment through an illuminance sensor (e.g., the sensor module 176 of FIG. 1) or may identify the external environment as indoor or outdoor. The electronic device 101 may apply a dark blur effect based on the illuminance of the external environment. For example, the electronic device 101 may increase the dark blur effect when the illuminance of the external environment is low, and conversely, the electronic device 101 may reduce the dark blur effect when the illuminance of the external environment is high. In an embodiment, the electronic device 101 may apply the dark blur effect only when the external environment is indoors, and may reduce or may not apply the dark blur effect when the external environment is outdoors.

In an embodiment, the dark blur effect may be displayed in a dark color, e.g., black or gray. The electronic device 101 may apply a different color of dark blur effect based on the illuminance of the external environment. In an embodiment, when the illuminance of the external environment is low or indoors, the electronic device may apply a dark blur effect in black, and when the illuminance of the external environment is high or outdoors, the electronic device may apply a dark blur effect in gray.

Figure 7:
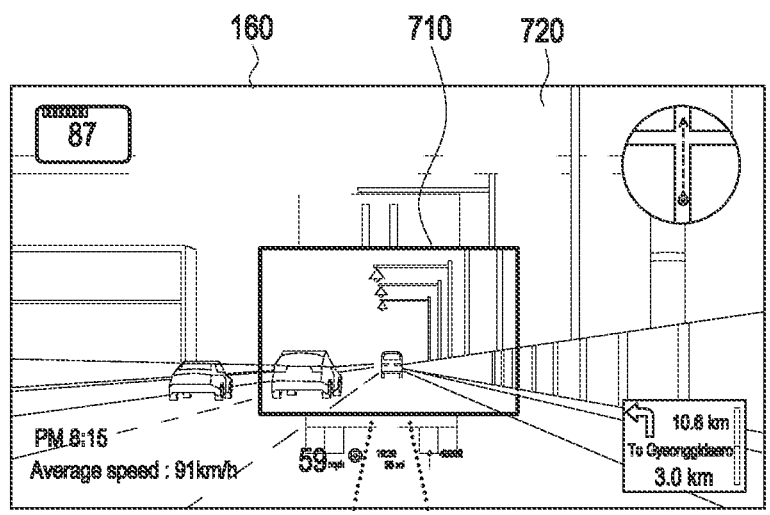
FIG. 7 illustrates a state in which the luminance of a part of a screen displayed on a display module including a first object is changed according to an embodiment of the disclosure.
Figure 7:
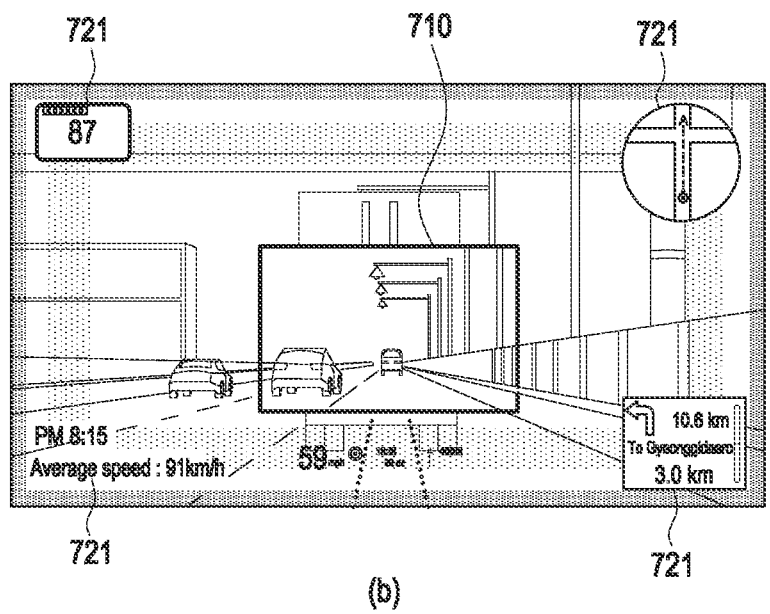

FIG. 7 illustrates a state in which the luminance of a part of a screen displayed on a display module including a first object is changed according to an embodiment of the disclosure.

Referring to FIG. 7, an electronic device (e.g., the electronic device 101 or the processor 120 of FIG. 1) according to an embodiment may control the display module 160 (e.g., illustrated in part (a) of FIG. 7) to display a designated screen, and may apply a dark blur effect to at least a portion of the outer area 720 positioned outside the gaze area 710 based on the temperature of the display module 160 (e.g., illustrated in part (b) of FIG. 7).

The display module 160 according to an embodiment may display a screen of AR content according to an execution or operation command of an application. In an embodiment, the AR content may be navigation and may include at least one first object 721.

The electronic device (e.g., the electronic device 101 or the processor 120 of FIG. 1) according to an embodiment may maintain the luminance of the first object 721 included in at least a part (e.g., the outer area 720) of the designated screen. In an embodiment, the electronic device 101 may maintain luminance without applying dark blur processing to the first object 721 disposed on the outer area 720 while applying dark blur processing to at least a part of the outer area 720.

Here, the first object 721 may be a graphic object of a user interface (UI) displayed on the background of the designated screen. For example, the first object 721 may have a purpose of providing a notification to the user, or may be an object of high importance that requires constant recognition by the user. For example, the first object 721 may be a direction indication window and/or a speed display window of the navigation screen.

In an embodiment, when the display module 160 is an LCOS, referring to Table 1 below, as the luminance of the display screen of the display module 160 gradually decreases (from step 5 to step 1), power consumption may gradually reduce.

TABLE 1

| Types | Step 5 | Step 4 | Step 3 | Step 2 | Step 1 |
|---|---|---|---|---|---|
| LCoS | 1000 [mW] | 1000 [mW] | 1000 [mW] | 1000 [mW] | 1000 [mW] |
| RGB LED | 600 [mW] | 500 [mW] | 400 [mW] | 300 [mW] | 200 [mW] |
| total | 1600 [mW] | 1500 [mW] | 1400 [mW] | 1300 [mW] | 1200 [mW] |

In an embodiment, when the display module 160 is an OLED, referring to Table 2 below, as the luminance of the display screen of the display module 160 gradually decreases (from step 5 to step 1), power consumption may gradually reduce.

TABLE 2

| Types | Step 5 | Step 4 | Step 3 | Step 2 | Step 1 |
|---|---|---|---|---|---|
| OLED | 1800 [mW] | 1650 [mW] | 1500 [mW] | 1350 [mW] | 1200 [mW] |

Therefore, according to an embodiment, power consumption of the electronic device 101 is reduced by reducing the luminance of the display screen displayed on the display module 160, so that heat generation of the electronic device 101 may be reduced. In an embodiment, when heat is generated in the display module 160, the electronic device 101 may reduce power consumption and heat generation of the display module 160 by reducing the luminance of the display module 160.

Figure 8:
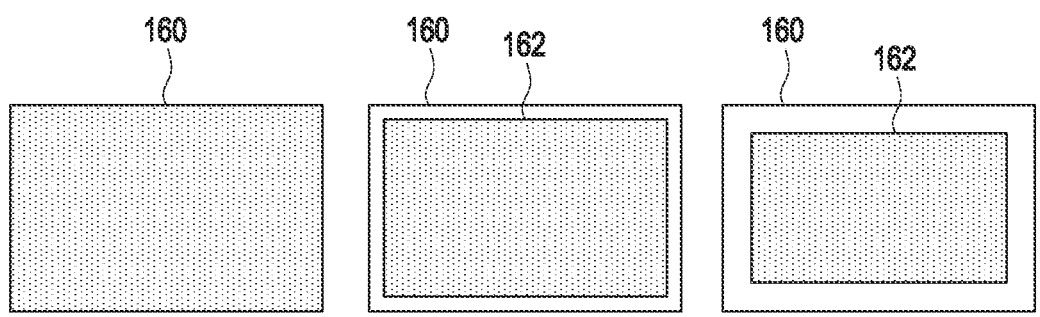
FIG. 8 illustrates a state of changing a display area of a display module according to an embodiment of the disclosure.

FIG. 8 illustrates a state in which the display area of the display module is changed according to an embodiment of the disclosure.

Referring to FIG. 8, an electronic device (e.g., the electronic device 101 or the processor 120 of FIG. 1) according to an embodiment may change a display area 162 of the display module 160, based on the temperature of the display module 160.

In an embodiment, based on the temperature of the display module 160, the electronic device 101 may reduce the active area 162 displaying a screen in the display module 160 and may increase the inactive area not displaying a screen. For example, when the temperature of the display module 160 is greater than or equal to the designated temperature, the electronic device 101 may reduce the display area 162 of the display module 160 by stopping displaying at least on a portion of the outer area (e.g., the outer area 720 of FIG. 6) positioned outside the gaze area (e.g., the gaze area 710 of FIG. 6). In an embodiment, the electronic device 101 may stop displaying from an area spaced far from the gaze area 710.

In an embodiment, as the temperature of the display module 160 increases, the electronic device 101 may gradually reduce the display area 162. In an embodiment, when the temperature of the display module 160 is less than the designated first temperature, the electronic device 101 may display a screen on the entire (100%) display area 162 of the display module 160. In an embodiment, when the temperature of the display module 160 is greater than or equal to the first temperature, the electronic device 101 may display a screen at a first ratio (e.g., 90%) of the display area 162 of the display module 160. In an embodiment, when the temperature of the display module 160 is greater than or equal to the second temperature higher than the first temperature, the electronic device 101 may display a screen at a second ratio (e.g., 80%) lower than the first ratio of the display area 162 of the display module 160.

Figure 9:
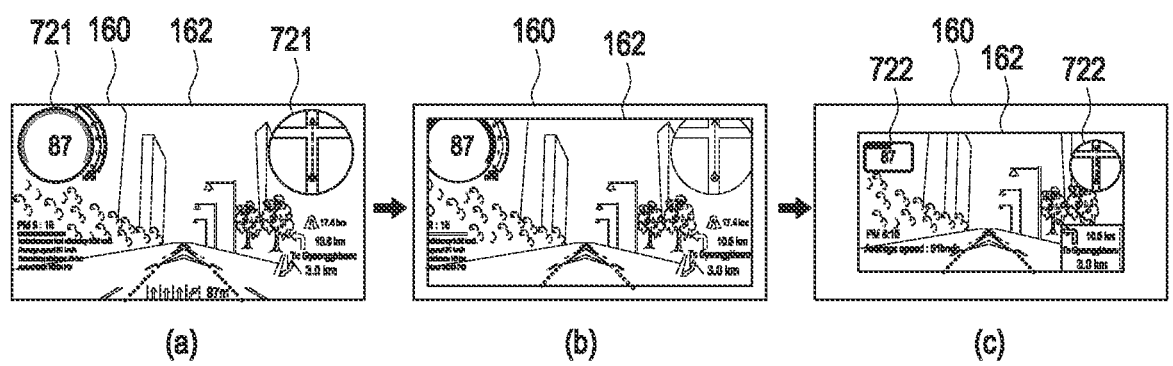
FIG. 9 illustrates an object changed as a display area of a display module is shrunken according to an embodiment of the disclosure.

FIG. 9 illustrates a first object changed as a display area of a display module is shrunken according to an embodiment of the disclosure.

Referring to FIG. 9, when the size of the display area 162 of the display module 160 is less than or equal to a designated size, the electronic device (e.g., the electronic device 101 or the processor 120 of FIG. 1) according to an embodiment may reduce the size of the first object 721 included in the designated screen or may change the first object 721 into a designated second object 722.

In an embodiment, as the temperature of the display module 160 gradually increases, the electronic device 101 may gradually reduce the display area 162 of the display module 160. In an embodiment, the electronic device 101 may reduce the display area 162 while maintaining the display screen of the display module 160 until the size of the display area 162 exceeds a designated size, so that at least a portion of the display screen may not be displayed as the display area 162 is reduced. For example, the electronic device 101 may reduce the display area 162 of the display module 160 from parts (a) to (b) of FIG. 9, and accordingly, at least a portion of the first object 721 included in the designated screen may not be displayed. When the size of the display area 162 of the display module 160 is greater than or equal to a designated size (e.g., 80% of the entire screen), the electronic device 101 may maintain the first object 721 included in the designated screen.

Referring to part (c) of FIG. 9, when the size of the display area 162 of the display module 160 is less than or equal to a designated size (e.g., 80% of the entire screen), the electronic device 101 may adjust the first object 721 included in the designated screen.

In an embodiment, the electronic device 101 may reduce the size of the first object 721 included in the designated screen. In an embodiment, the electronic device 101 may change the style or icon of the first object 721 to another form. In an embodiment, the electronic device 101 may change the font of the character, the number, or the symbol included in the first object 721, or may reduce the size thereof. Accordingly, even if the display area 162 of the display module 160 is reduced, the first object 721 included in the display screen may be continuously displayed to prevent degradation of usability.

In an embodiment, the electronic device 101 may change the first object 721 included in the designated screen displayed on the display module 160 into the designated second object 722. Here, the designated second object 722 may be an object reduced in size or moved inward as compared to the first object 721.

In an embodiment, when the display module 160 is an LCOS, referring to Table 3 below, as the display area 162 of the display module 160 gradually decreases, power consumption may gradually reduce.

TABLE 3

| Types | full size | 10% reduction on left and right | 20% reduction on left and right | 30% reduction on left and right | 40% reduction on left and right |
|---|---|---|---|---|---|
| LCoS | 1000 [mW] | 810 [mW] | 640 [mW] | 490 [mW] | 360 [mW] |
| RGB LED | 600 [mW] | 500 [mW] | 400 [mW] | 300 [mW] | 200 [mW] |
| total | 1600 [mW] | 1310 [mW] | 1040 [mW] | 790 [mW] | 560 [mW] |

In an embodiment, when the display module 160 is an OLED, referring to Table 4 below, as the display area 162 of the display module 160 gradually decreases, power consumption may gradually reduce.

TABLE 4

| Types | full size | 10% reduction on left and right | 20% reduction on left and right | 30% reduction on left and right | 40% reduction on left and right |
|---|---|---|---|---|---|
| OLED | 1800 [mW] | 1450 [mW] | 1150 [mW] | 900 [mW] | 650 [mW] |

Therefore, according to an embodiment, power consumption of the electronic device 101 is reduced by reducing the display area 162 of the display module 160, so that heat generation of the electronic device 101 may be reduced. According to an embodiment, when heat is generated in the display module 160, the electronic device 101 may reduce power consumption and heat generation of the display module 160 by reducing the display area 162 of the display module 160. According to an embodiment, the electronic device (e.g., the electronic device 101 or the processor 120 of FIG. 1) may change the luminance of at least a part or may change the display area 162 of the display module 160 based on the identified temperature distribution.

In an embodiment, a large amount of heat may be generated in an area of the display module 160 where a screen of a relatively bright color is displayed, and there may be an area in which heat dissipation by a heat dissipation structure is difficult due to hardware or software differences. The electronic device 101 may reduce heat generation by reducing the luminance of the screen for the part of the designated screen in which the temperature of the display module 160 is increased, or by changing the display area 162 such that the screen is not displayed in the part of the designated screen.

In an embodiment, the electronic device 101 may obtain at least one temperature measured by at least one thermistor 161 and may identify at least some of the obtained temperatures that are greater than or equal to a designated temperature. In an embodiment, the electronic device 101 may identify the temperature distribution of the display module 160, based on the temperature of the at least one thermistor 161, and may identify at least a part having a designated temperature or more.

In an embodiment, the electronic device 101 may reduce the luminance of the screen displayed in at least a partial area of the display module 160 in which at least some of the at least one thermistor 161 corresponding to at least some temperatures identified as the designated temperature or higher are disposed.

In an embodiment, the electronic device 101 may change the display area 162 of the display module 160 to exclude at least a partial area of the designated screen in which at least some of the at least one thermistor 161 corresponding to the identified at least some temperatures are disposed.

Figure 10:
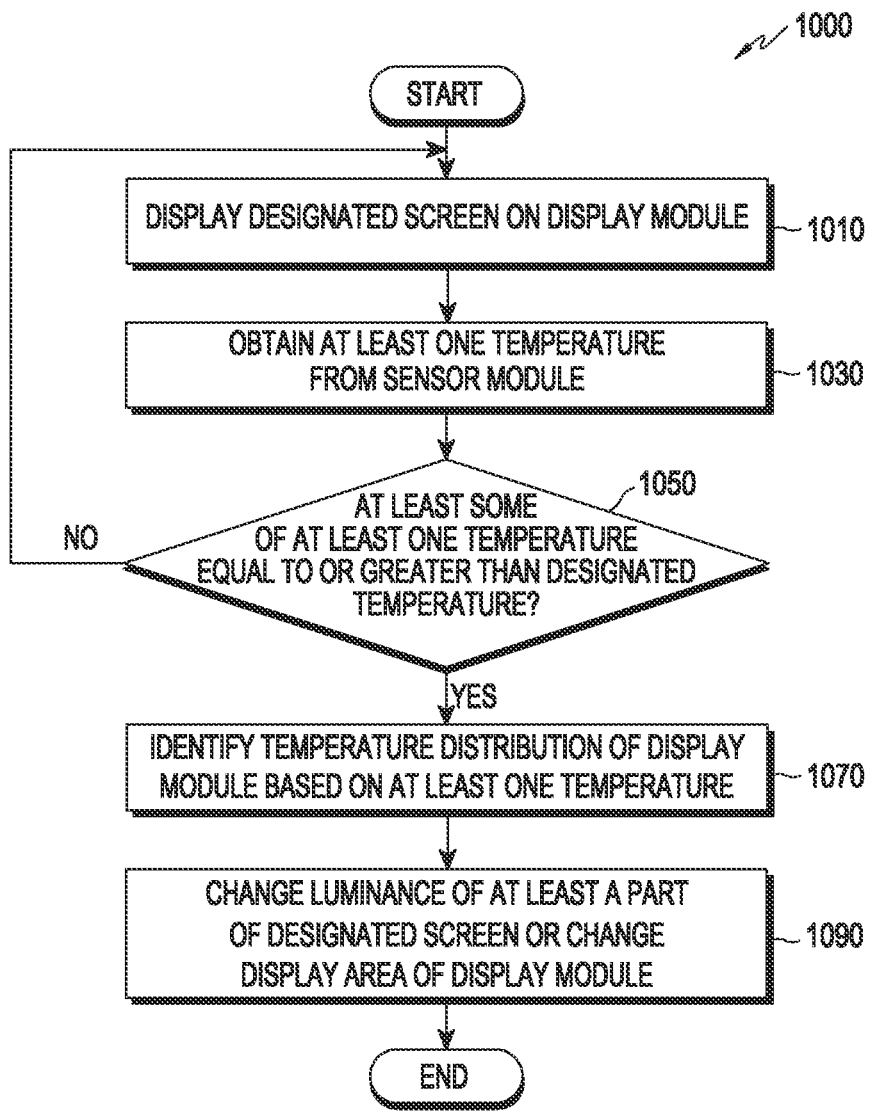
FIG. 10 is a flowchart illustrating an operation method of an electronic device according to an embodiment of the disclosure.

FIG. 10 is a flowchart illustrating an operation method of an electronic device according to an embodiment of the disclosure.

Referring to a flowchart 1000 of FIG. 10, an electronic device (e.g., the electronic device 101 or the processor 120 of FIG. 1) according to an embodiment may control the display module 160 to display a designated screen, in operation 1010. Here, the designated screen may be a screen in which an object corresponding to AR content is displayed on an image captured for an external environment or a designated background.

In operation 1030, the electronic device according to an embodiment may obtain at least one temperature from the sensor module 176. For example, at least one thermistor 161 may be disposed on the display module 160, and the sensor module 176 may measure the temperature corresponding to at least a partial area of the display module 160 at the position where each thermistor 161 is disposed. In an embodiment, the at least thermistor 161 may be disposed on the display module 160 extended in the planar direction to be spaced apart from each other in the planar direction, so that the sensor module 176 may measure the entire temperature (e.g., average temperature) of the display module 160 and/or the local temperature of a partial area thereof.

In operation 1050, the electronic device according to an embodiment may determine whether at least some of the at least one temperature obtained from the sensor module 176 are greater than or equal to a designated temperature. For example, when all of the at least one temperature obtained from the sensor module 176 are less than the designated temperature, the display module 160 may maintain display of the designated screen without any operation described below.

When at least some of the at least one temperature obtained from the sensor module 176 are greater than or equal to the designated temperature, the electronic device according to an embodiment may identify the temperature distribution of the display module 160 based on the at least one temperature in operation 1070.

In an embodiment, the electronic device may identify that at least a partial area of the display module 160 corresponding to the corresponding temperature is exposed to a high temperature, based on at least some of the at least one temperature obtained from the sensor module 176 that are greater than or equal to the designated temperature.

In operation 1090, the electronic device according to an embodiment may change the luminance of at least a part of a designated screen or may change the display area 162 of the display module 160, based on the identified temperature distribution of the display module 160 or at least one temperature obtained from the sensor module 176.

According to an embodiment, the electronic device may reduce luminance of the outer area 720 of the user's gaze area 710 or may reduce the display area 162 of the display module 160, when the average temperature or at least one temperature is equal to or higher than the designated temperature, based on at least one temperature obtained from the sensor module 176.

According to an embodiment, the electronic device may reduce luminance for at least a partial area in which at least some of the at least one thermistor 161 corresponding to at least some temperatures are disposed or may change the display area 162 to exclude at least the partial area, based on the identified temperature distribution of the display module 160 or at least one temperature obtained from the sensor module 176.

Figure 11:
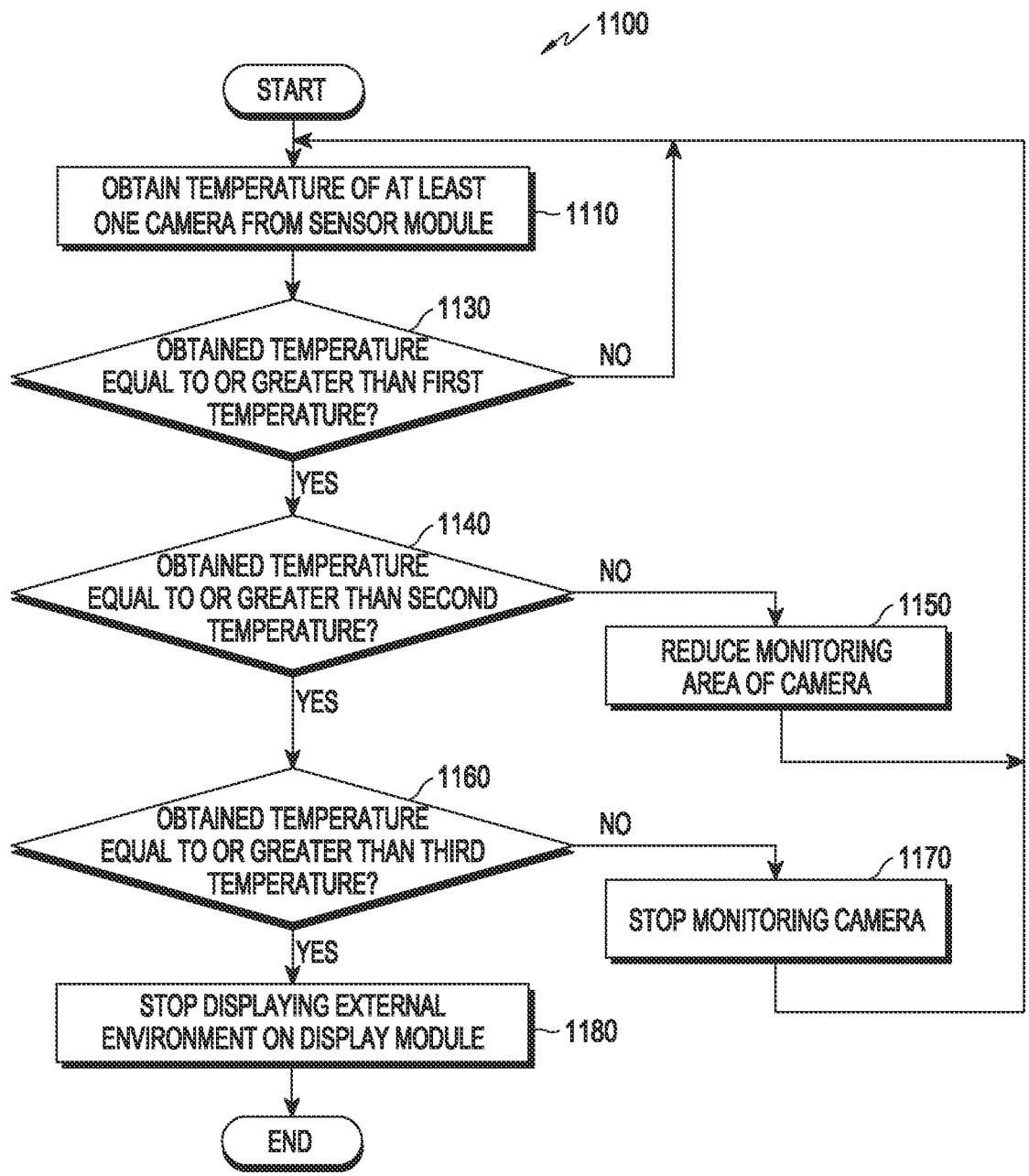
FIG. 11 is a flowchart illustrating an operation method of an electronic device according to an embodiment of the disclosure.

FIG. 11 is a flowchart illustrating an operation method of an electronic device according to an embodiment of the disclosure.

Referring to a flow chart 1100 of FIG. 11, an electronic device (e.g., the electronic device 101 or the processor 120 of FIG. 1) according to an embodiment may obtain the temperature of at least one camera (e.g., the camera module 180 of FIG. 1) from the sensor module 176 in operation 1110. The at least one camera 180 may be a camera (e.g., the second camera module 253 of FIG. 2B) that captures an external environment, a camera (e.g., the third camera module 255 of FIG. 2B) that monitors the user's gesture, or a camera (e.g., the first camera module 251 of FIG. 2B) that captures the user's eye.

In an embodiment, at least one thermistor 161 for detecting heat generation may be mounted in the electronic device, and the mounting position of the at least one thermistor 161 may be a position where heat generation is expected. For example, as described above, the at least one thermistor 161 may be disposed on the display module 160, and the at least one thermistor 161 may be mounted at a position adjacent to the processor or the charging IC to measure the temperature of the processor or the charging IC. Further, at least one thermistor 161 may be positioned adjacent to the communication module 190 for measuring the temperature of the communication module (e.g., a communication component for long-term evolution (LTE) or 5G communication).

In an embodiment, the at least one thermistor 161 may be disposed on at least one camera included in the electronic device, and the sensor module 176 may obtain the temperature of the at least one camera using the at least one thermistor 161. In an embodiment, the at least one camera is a component that keeps running when the electronic device operates and, as it is driven even when there is no input from the user or output to the user, heat generation may be frequent.

The electronic device according to an embodiment may determine whether the temperature corresponding to the at least one camera obtained in operation 1130 is greater than or equal to a designated first temperature. For example, when the obtained temperature is less than the designated first temperature, the electronic device may maintain an operation related to capturing by the camera and/or an operation related to screen display by the display module 160.

When the obtained temperature corresponding to the at least one camera is equal to or greater than the designated first temperature, the electronic device according to an embodiment may determine whether the temperature is equal to or greater than a designated second temperature, which is higher than the designated first temperature, in operation 1140. For example, when it is determined that the temperature is less than the designated second temperature, the electronic device may reduce the monitoring area of the camera in operation 1150. In an embodiment, the at least one camera may be disposed such that the monitoring area (field of view (FOV)) faces downward of the electronic device to capture the user's gesture and, when the temperature corresponding to the camera is greater than or equal to the designated first temperature and less than the designated second temperature, the monitoring area FOV of the camera may be reduced. According to an embodiment, the electronic device may reduce the monitoring area FOV of the camera by stopping some of the at least one camera and driving only the remaining cameras.

When the obtained temperature corresponding to the at least one camera is equal to or greater than the designated second temperature, the electronic device according to an embodiment may determine whether the temperature is equal to or greater than a designated third temperature, which is higher than the designated second temperature, in operation 1160. For example, when it is determined that the temperature is less than the designated third temperature, the electronic device may stop monitoring the camera in operation 1170. In an embodiment, the at least one camera may be disposed such that the monitoring area FOV faces downward of the electronic device to capture the user's gesture and, when the temperature corresponding to the camera is greater than or equal to the designated second temperature and less than the designated third temperature, the monitoring of the camera may be stopped. In an embodiment, when the temperature corresponding to the camera is greater than or equal to the designated second temperature and less than the designated third temperature, the electronic device may continuously display the image captured through the camera capturing the external environment on the display module 160.

When the obtained temperature corresponding to the at least one camera is greater than or equal to the designated third temperature, the electronic device according to an embodiment may stop displaying the external environment on the display module 160 in operation 1180. In an embodiment, when the temperature corresponding to the camera is greater than or equal to the designated third temperature, the electronic device may stop driving of all of the at least one camera and thus stop displaying the external environment on the display module 160. In an embodiment, the electronic device may display a designated background and an object on the display module 160, or may display only an object providing a notification.

An electronic device 101, 200, or 300 according to an embodiment of the disclosure may comprise an optical lens 270 or 201, a display module 160, 211, or 321 configured to display a screen through the optical lens 270 or 201, a sensor module 176 configured to measure a temperature of the display module 160, 211, or 321 at one or more positions, and at least one processor 120. The at least one processor 120 may be configured to control the display module 160, 211, or 321 to display a designated screen. The at least one processor 120 may be configured to obtain at least one temperature respectively corresponding to the one or more positions from the sensor module 176 while displaying the designated screen. The at least one processor 120 may be configured to, based on the obtained at least one temperature, change a luminance of at least a part of the designated screen or change a display area 162 of the display module 160, 211, or 321 based on the obtained at least one temperature.

In the electronic device 101, 200, or 300 according to an embodiment, the display module 160, 211, or 321 may include a silicon panel and a flexible printed circuit board extended in a planar direction. The sensor module 176 may include at least one thermistor 161 thermally connected to the silicon panel or the flexible printed circuit board at the one or more positions. The at least one thermistor 161 may be disposed to be spaced apart from each other in the planar direction in which the silicon panel or the flexible printed circuit board is extended.

In the electronic device 101, 200, or 300 according to an embodiment, the at least one processor 120 may be configured to, as at least part of obtaining the at least one temperature, obtain at least one temperature of the at least one thermistor 161, respectively, identify a temperature distribution of the display module 160, 211, or 321 based on the at least one temperature. The at least one processor 120 may be configured to, as at least part of changing the luminance of the at least the part or changing the display area 162, change the luminance of the at least the part of the designated screen or change the display area 162 based on the identified temperature distribution.

In the electronic device 101, 200, or 300, the at least one processor 120 may be configured to, as at least part of identifying the temperature distribution, identify at least some temperatures, which are a designated temperature or higher, among the at least one temperature. The at least one processor 120 may be configured to, as at least part of changing the luminance of the at least the part of the designated screen or changing the display area 162, decrease the luminance of at least a partial area of the designated screen where at least some of the at least one thermistor 161 corresponding to the identified at least some temperatures are disposed.

In the electronic device 101, 200, or 300, the at least one processor 120 may be configured to, as at least part of identifying the temperature distribution, identify at least some temperatures, which are a designated temperature or higher, among the at least one temperature. The at least one processor 120 may be configured to, as at least part of changing the luminance of the at least the part or changing the display area 162, change the display area 162 to exclude at least a partial area of the designated screen where at least some of the at least one thermistor 161 corresponding to the identified at least some temperatures are disposed.

In the electronic device 101, 200, or 300 according to an embodiment, the at least one processor 120 may be configured to, as at least part of changing the luminance of the at least the part of the designated screen or changing the display area 162, decrease a luminance for an outer area 720 of a user's gaze area 710 based on the obtained at least one temperature.

In the electronic device 101, 200, or 300 according to an embodiment, the at least one processor 120 may be configured to, as at least part of changing the luminance of the at least the part of the designated screen or changing the display area 162, maintain a luminance for a first object 721 included in the at least the part of the designated screen of the designated screen.

In the electronic device 101, 200, or 300 according to an embodiment, the at least one processor 120 may be configured to, as at least part of changing the luminance of the at least the part of the designated screen or changing the display area 162, gradually decrease the luminance of the outer area (720) according to being distanced from the gaze area 710.

In the electronic device 101, 200, or 300 according to an embodiment, the at least one processor 120 may be configured to, as at least part of changing the luminance of the at least the part of the designated screen or changing the display area 162, decrease a size of the display area 162 of the display module 160, 211, or 321 based on the obtained at least one temperature.

In the electronic device 101, 200, or 300 according to an embodiment, the at least one processor 120 may be configured to, as at least part of changing the luminance of the at least the part of the designated screen or changing the display area 162, when the size of the display area 162 is a designated size or less, decrease a size of a first object 721 included in the designated screen or change the first object 721 into a designated second object 722.

A method for operating an electronic device 101, 200, or 300 according to an embodiment of the disclosure may comprise controlling a display module 160, 211, or 321 configured to display a screen through an optical lens 270 or 201 to display a designated screen. The method for operating the electronic device 101, 200, or 300 according to an embodiment may comprise obtaining, at operation 1030, at least one temperature respectively corresponding to one or more positions from a sensor module 176 configured to measure a temperature of the display module 160, 211, or 321 at the one or more positions while displaying the designated screen. The method for operating the electronic device 101, 200, or 300 according to an embodiment may comprise, based on the obtained at least one temperature, changing, at operation 1090, a luminance of at least a part of the designated screen or changing a display area 162 of the display module 160, 211, or 321 based on the obtained at least one temperature.

In the method for operating the electronic device 101, 200, or 300 according to an embodiment, obtaining, at operation 1030, the at least one temperature may obtain at least one temperature of at least one thermistor 161, respectively, disposed to be spaced apart from each other in a planar direction on a silicon panel or a flexible printed circuit board extended in the planar direction included in the display module 160, 211, or 321.

The method for operating the electronic device 101, 200, or 300 according to an embodiment may further comprise identifying, at operation 1070, a temperature distribution of the display module 160, 211, or 321 based on the at least one temperature. Changing, at operation 1090, the luminance of the at least the part of the designated screen or changing the display area 162 may change the luminance of the at least the part of the designated screen or change the display area 162 based on the identified temperature distribution.

In the method for operating the electronic device 101, 200, or 300 according to an embodiment, identifying, at operation 1070, the temperature distribution may identify at least some temperatures, which are a designated temperature or higher, among the at least one temperature. Changing, at operation 1090, the luminance of the at least the part of the designated screen or changing the display area 162 may decrease the luminance of at least a partial area of the designated screen where at least some of the at least one thermistor 161 corresponding to the identified at least some temperatures are disposed.

In the method for operating the electronic device 101, 200, or 300 according to an embodiment, identifying, at operation 1070, the temperature distribution may identify at least some temperatures, which are a designated temperature or higher, among the at least one temperature. Changing, at operation 1090, the luminance of the at least the part of the designated screen or changing the display area 162 may change the display area 162 to exclude at least a partial area of the designated screen where at least some of the at least one thermistor 161 corresponding to the identified at least some temperatures are disposed.

In the method for operating the electronic device 101, 200, or 300 according to an embodiment, changing, at operation 1090, the luminance of the at least the part of the designated screen or changing the display area 162 may decrease a luminance for an outer area 720 of a user's gaze area 710 based on the obtained at least one temperature.

In the method for operating the electronic device 101, 200, or 300 according to an embodiment, changing, at operation 1090, the luminance of the at least the part of the designated screen or changing the display area 162 may maintain a luminance for a first object 721 included in the at least the part of the designated screen.

In the method for operating the electronic device 101, 200, or 300 according to an embodiment, changing, at operation 1090, the luminance of the at least the part of the designated screen or changing the display area 162 may gradually decrease the luminance of the outer area (720) according to being distanced from the gaze area 710.

In the method for operating the electronic device 101, 200, or 300 according to an embodiment, changing, at operation 1090, the luminance of the at least the part of the designated screen or changing the display area 162 may decrease a size of the display area 162 of the display module 160, 211, or 321 based on the obtained at least one temperature.

In the method for operating the electronic device 101, 200, or 300 according to an embodiment, changing, at operation 1090, the luminance of the at least the part of the designated screen or changing the display area 162, when the size of the display area 162 is a designated size or less, may decrease a size of a first object 721 included in the designated screen or changes the first object 721 into a designated second object 722.

According to an embodiment of the disclosure, a non-transitory computer-readable storage medium 130 storing one or more programs may comprise controlling a display module 160, 211, or 321 configured to display a screen through an optical lens 270 or 201 to display a designated screen based on execution of an application. The storage medium 130 according to an embodiment may include obtaining at least one temperature respectively corresponding to one or more positions from a sensor module 176 configured to measure a temperature of the display module 160, 211, or 321 at the one or more positions while displaying the designated screen. The storage medium 130 according to an embodiment may include, based on the obtained at least one temperature, changing a luminance of at least a part of the designated screen or changing a display area 162 of the display module 160, 211, or 321 based on the obtained at least one temperature.

The electronic device according to an embodiment may be one of various types of electronic devices. The electronic devices may include, for example, a portable communication device (e.g., a smart phone), a computer device, a portable multimedia device, a portable medical device, a camera, an electronic device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   an optical lens;
   a display configured to display a screen through the optical lens;
   a sensor configured to measure a temperature of the display one or more positions;
   memory storing one or more computer programs; and
   one or more processors communicatively coupled to the display and the memory,
   wherein one or more computer programs include computer-executable instructions that, when executed by the one or more processors individually or collectively, cause the electronic device to:
      control to the display to display a designated screen,
      obtain at least one temperature respectively corresponding to the one or more positions from the sensor while displaying the designated screen, and
      based on the obtained at least one temperature, change luminance of at least a part of the designated screen by applying a dark blur effect to an outer area of the designated screen such that luminance of the outer area of the designated screen is gradually reduced according to being distanced from a center area of the designated screen surrounded by the outer area of the designated screen.

2. The electronic device of claim 1,
   wherein the display includes a silicon panel and a flexible printed circuit board extended in a planar direction,
   wherein the sensor includes at least one thermistor thermally connected to the silicon panel or the flexible printed circuit board at the one or more positions, and
   wherein the at least one thermistor is disposed to be spaced apart from each other in the planar direction in which the silicon panel or the flexible printed circuit board is extended.

3. The electronic device of claim 2, wherein the one or more computer programs further include computer-executable instructions that, when executed by the one or more processors individually or collectively, cause the electronic device to:
   as at least part of obtaining the at least one temperature, obtain at least one temperature of the at least one thermistor respectively,
   identify a temperature distribution of the display based on the at least one temperature, and
   change the luminance of the at least the part of the designated screen based on the identified temperature distribution.

4. The electronic device of claim 3, wherein the one or more computer programs further include computer-executable instructions that, when executed by the one or more processors individually or collectively, cause the electronic device to:
   as at least part of identifying the temperature distribution, identify at least some temperatures, which are a designated temperature or higher, among the at least one temperature, and
   as at least part of changing the luminance of the at least the part of the designated screen, decrease the luminance of at least a partial area of the designated screen where at least some of the at least one thermistor corresponding to the identified at least some temperatures are disposed.

5. The electronic device of claim 3, wherein the one or more computer programs further include computer-executable instructions that, when executed by the one or more processors individually or collectively, cause the electronic device to:
   as at least part of identifying the temperature distribution, identify at least some temperatures, which are a designated temperature or higher, among the at least one temperature, and
   change a display area of the display to exclude at least a partial area of the designated screen where at least some of the at least one thermistor corresponding to the identified at least some temperatures are disposed.

6. The electronic device of claim 1, wherein the one or more computer programs further include computer-executable instructions that, when executed by the one or more processors individually or collectively, cause the electronic device to:
   as at least part of changing the luminance of the at least the part of the designated screen, decrease luminance for an outer area of a user's gaze area based on the obtained at least one temperature.

7. The electronic device of claim 6, wherein the one or more computer programs further include computer-executable instructions that, when executed by the one or more processors individually or collectively, cause the electronic device to:
   as at least part of changing the luminance of the at least the part of the designated screen, maintain luminance for a first object included in the at least the part of the designated screen.

8. The electronic device of claim 1, wherein the one processer one or more computer programs further include computer-executable instructions that, when executed by the one or more processors individually or collectively, cause the electronic device to:
   decrease a size of a display area of the display based on the obtained at least one temperature.

9. The electronic device of claim 8, wherein the one or more computer programs further include computer-executable instructions that, when executed by the one or more processors individually or collectively, cause the electronic device to:
   when the size of the display area is a designated size or less, decrease a size of a first object included in the designated screen or change the first object into a designated second object.

10. A method for operating an electronic device, the method comprising:
    controlling a display configured to display a screen through an optical lens to display a designated screen;
    obtaining at least one temperature respectively corresponding to one or more positions from a sensor configured to measure a temperature of the display at the one or more positions while displaying the designated screen; and based on the obtained at least one temperature, changing luminance of at least a part of the designated screen by applying a dark blur effect to an outer area of the designated screen such that luminance of the outer area of the designated screen is gradually reduced according to being distanced from a center area of the designated screen surrounded by the outer area of the designated screen.

11. The method of claim 10, wherein the obtaining of the at least one temperature obtains at least one temperature of at least one thermistor disposed to be spaced apart from each other in a planar direction on a silicon panel or a flexible printed circuit board is extended in the planar direction included in the display, respectively.

12. The method of claim 11, further comprising:
identifying a temperature distribution of the display based on the at least one temperature,
wherein the changing of the luminance of the at least one the part of the designated screen changes the luminance of the at least the part of the designated screen based on the identified temperature distribution.

13. The method of claim 12,
wherein the identifying of the temperature distribution identifies at least some temperatures, which are a designated temperature or higher, among the at least one temperature, and
wherein the changing of the luminance of the at least the part of the designated screen decreases the luminance of at least a partial area of the designated screen where at least some of the at least one thermistor corresponding to the identified at least some temperatures are disposed.

14. The method of claim 12,
wherein the identifying of the temperature distribution identifies at least some temperatures, which are a designated temperature or higher, among the at least one temperature, and
wherein the method further comprises changing a display area changes the display area to exclude at least a partial area of the designated screen where at least some of the at least one thermistor corresponding to the identified at least some temperatures are disposed.

15. The method of claim 10, wherein the changing of the luminance of the at least the part of the designated screen decreases luminance for an outer area of a user's gaze area based on the obtained at least one temperature.

16. The method of claim 15, wherein the changing of the luminance of the at least the part of the designated screen maintains luminance for a first object included in the at least the part of the designated screen of the designated screen.

17. The method of claim 10, further comprising:
decreasing a size of a display area of the display based on the obtained at least one temperature.

18. The method of claim 17, further comprising:
when the size of the display area is a designated size or less, decreasing a size of a first object included in the designated screen or changes the first object into a designated second object.

19. A non-transitory computer-readable storage medium for storing instructions which, when executed by at least one processor of an electronic device, control the electronic device to perform:
controlling a display configured to display a screen through an optical lens to display a designated screen;
obtaining at least one temperature respectively corresponding to one or more positions from a sensor configured to measure a temperature of the display at the one or more positions while displaying the designated screen; and
based on the obtained at least one temperature, changing luminance of at least a part of the designated screen by applying a dark blur effect to an outer area of the designated screen such that luminance of the outer area of the designated screen is gradually reduced according to being distanced from a center area of the designated screen surrounded by the outer area of the designated screen.

* * * * *